United States Patent
Sasturkar et al.

(10) Patent No.: US 10,454,753 B2
(45) Date of Patent: *Oct. 22, 2019

(54) RANKING NETWORK ANOMALIES IN AN ANOMALY CLUSTER

(71) Applicant: Lightbend, Inc., San Francisco, CA (US)

(72) Inventors: Amit Sasturkar, San Jose, CA (US); Alan Ngai, Santa Clara, CA (US)

(73) Assignee: Lightbend, Inc., San Francisco, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 15/494,519

(22) Filed: Apr. 23, 2017

(65) Prior Publication Data

US 2017/0230229 A1    Aug. 10, 2017

Related U.S. Application Data

(63) Continuation of application No. 14/276,846, filed on May 13, 2014, now Pat. No. 9,632,858.

(Continued)

(51) Int. Cl.
*G06F 11/00* (2006.01)
*H04L 12/24* (2006.01)
(Continued)

(52) U.S. Cl.
CPC ........ *H04L 41/0631* (2013.01); *G06F 11/079* (2013.01); *G06F 11/0709* (2013.01);
(Continued)

(58) Field of Classification Search
CPC .................. G06F 11/3082; G06F 11/0781
See application file for complete search history.

(56) References Cited

U.S. PATENT DOCUMENTS

8,984,116 B2    3/2015    Ge et al.
9,558,056 B2 *  1/2017    Sasturkar ............ G06F 11/0709
(Continued)

OTHER PUBLICATIONS

U.S. Appl. No. 14/276,846—Office Action dated Nov. 23, 2015, 13 pages.

(Continued)

*Primary Examiner* — Christopher S McCarthy
(74) *Attorney, Agent, or Firm* — Haynes Beffel & Wolfeld, LLP; Ernest J. Beffel, Jr.

(57) ABSTRACT

The technology disclosed relates to organizing network performance metrics into historical anomaly dependency data. In particular, it relates to calculating cascading failure relationships between correlated anomalies detected in a network. It also relates to illustrating to a network administrator causes of system failure by laying out the graph to show a progression over time of the cascading failures and identify root causes of the cascading failures. It also relates to ranking anomalies and anomaly clusters in the network based on attributes of the resources exhibiting anomalous performances and attributes of the anomalous performances. It further relates to depicting evolution of resource failures across a network by visually coding impacted resources and adjusting the visual coding over time and allowing replay over time to visualize propagation of anomalous performances among the impacted resource.

19 Claims, 25 Drawing Sheets

Anomaly Correlation Environment

Related U.S. Application Data

(60) Provisional application No. 61/859,279, filed on Jul. 28, 2013, provisional application No. 61/859,282, filed on Jul. 28, 2013, provisional application No. 61/859,280, filed on Jul. 28, 2013.

(51) Int. Cl.

| | | |
|---|---|---|
| *G06F 16/26* | (2019.01) | |
| *G06F 16/28* | (2019.01) | |
| *G06F 16/2457* | (2019.01) | |
| *G06F 11/07* | (2006.01) | |
| *H04L 12/26* | (2006.01) | |
| *G06F 11/30* | (2006.01) | |
| *G06F 11/34* | (2006.01) | |

(52) U.S. Cl.
CPC ...... *G06F 11/3006* (2013.01); *G06F 11/3409* (2013.01); *G06F 16/24578* (2019.01); *G06F 16/26* (2019.01); *G06F 16/285* (2019.01); *H04L 41/064* (2013.01); *H04L 41/065* (2013.01); *H04L 41/145* (2013.01); *H04L 41/22* (2013.01); *H04L 43/04* (2013.01)

(56) References Cited

U.S. PATENT DOCUMENTS

| | | | |
|---|---|---|---|
| 9,632,858 B2 * | 4/2017 | Sasturkar | G06F 11/0709 |
| 2003/0225876 A1 | 12/2003 | Oliver et al. | |
| 2005/0188240 A1 | 8/2005 | Murphy et al. | |
| 2005/0219151 A1 | 10/2005 | Li et al. | |
| 2008/0155335 A1 | 6/2008 | Klein et al. | |
| 2010/0027432 A1 | 2/2010 | Gopalan et al. | |
| 2010/0128600 A1 | 5/2010 | Srinivasmurthy et al. | |
| 2013/0055020 A1 | 2/2013 | Krishnan et al. | |
| 2013/0110761 A1 | 5/2013 | Viswanathan et al. | |
| 2013/0198119 A1 | 8/2013 | Eberhardt, III et al. | |
| 2014/0129876 A1 | 5/2014 | Addepalli et al. | |
| 2014/0173336 A1 | 6/2014 | Bennah et al. | |
| 2015/0033080 A1 | 1/2015 | Lee | |
| 2016/0217022 A1 | 7/2016 | Velipasaoglu et al. | |
| 2017/0063905 A1 | 3/2017 | Muddu et al. | |

OTHER PUBLICATIONS

U.S. Appl. No. 14/276,826—Office Action dated Jan. 11, 2016, 20 pages.
U.S. Appl. No. 14/276,846—Office Action dated Mar. 28, 2016, 14 pages.
U.S. Appl. No. 14/276,826—Notice of Allowance dated Sep. 21, 2016, 5 pages.
U.S. Appl. No. 14/276,846—Notice of Allowance dated Dec. 16, 2016, 10 pages.
U.S. Appl. No. 14/276,826—Response to Office Action dated Jan. 11, 2016 filed Jul. 11, 2016, 16 pages.
U.S. Appl. No. 14/276,846—Response to Office Action dated Nov. 23, 2015 filed Feb. 23, 2016, 17 pages.
U.S. Appl. No. 14/276,846—Response to Office Action dated Mar. 28, 2016 filed Sep. 28, 2016, 12 pages.
U.S. Appl. No. 15/289,114—Office Action dated Jun. 4, 2018, 23 pages.
U.S. Appl. No. 15/289,112—Office Action dated Jun. 27, 2018, 11 pages.

* cited by examiner

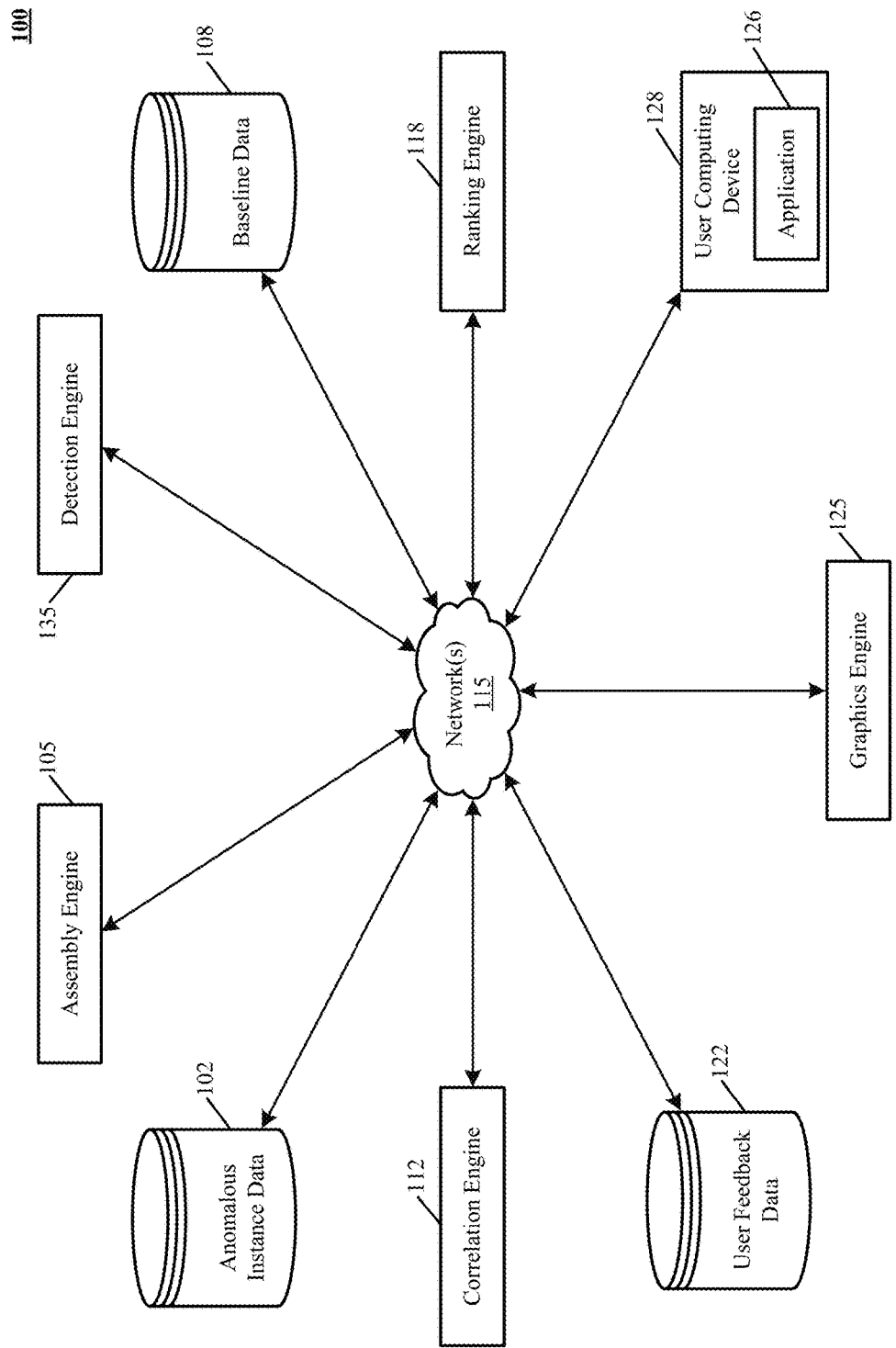
FIG. 1 – Anomaly Correlation Environment

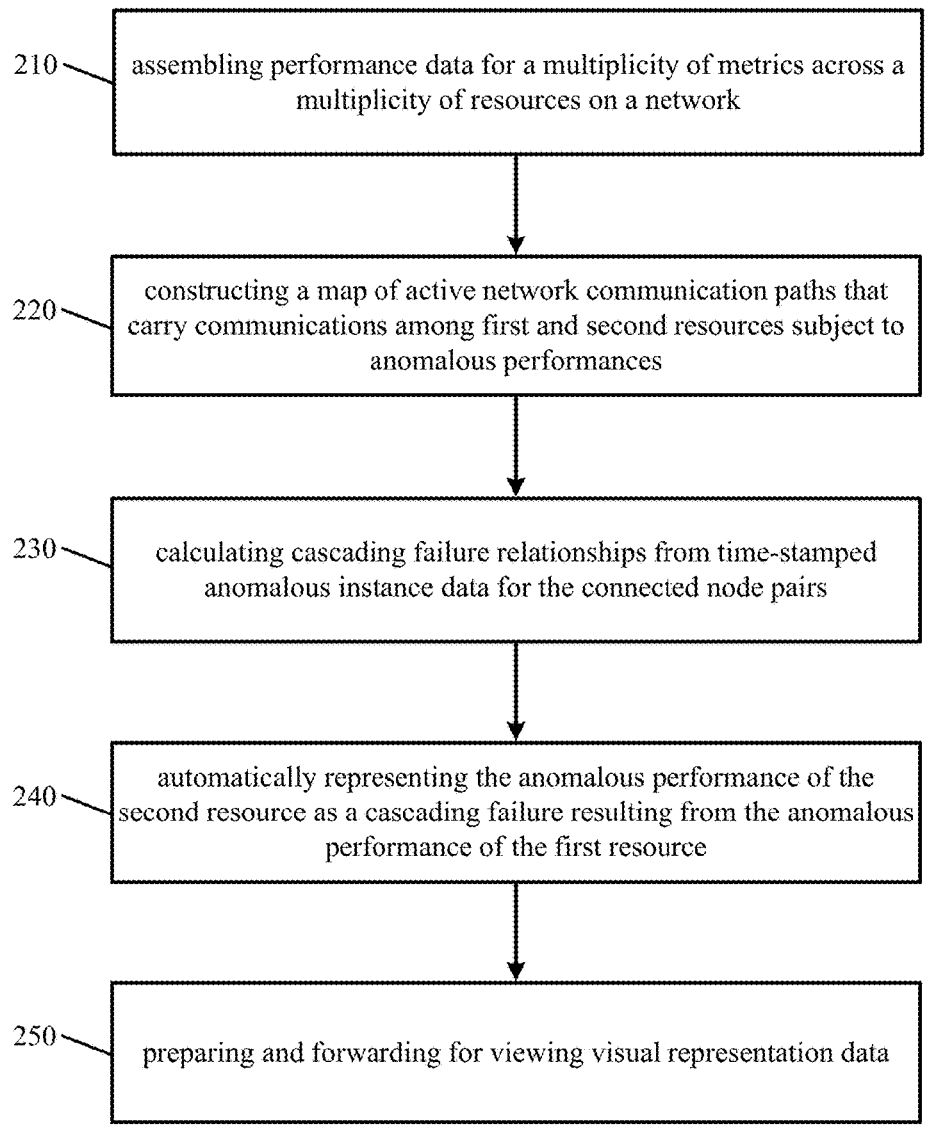
FIG. 2 – Flowchart of Organizing Network Performance Metrics into Historical Anomaly Dependency Data

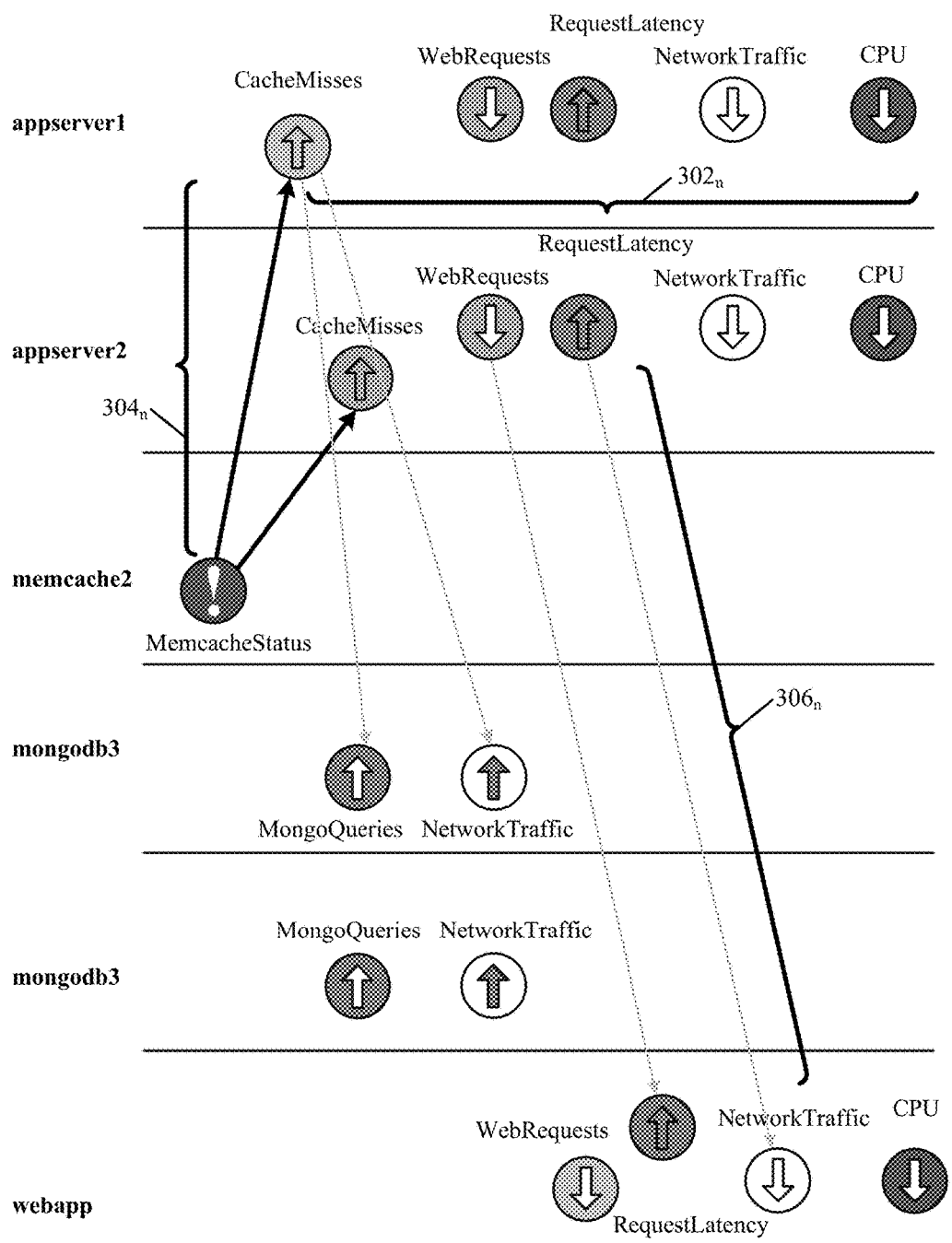
FIG. 3A – Anomaly Impact Graph

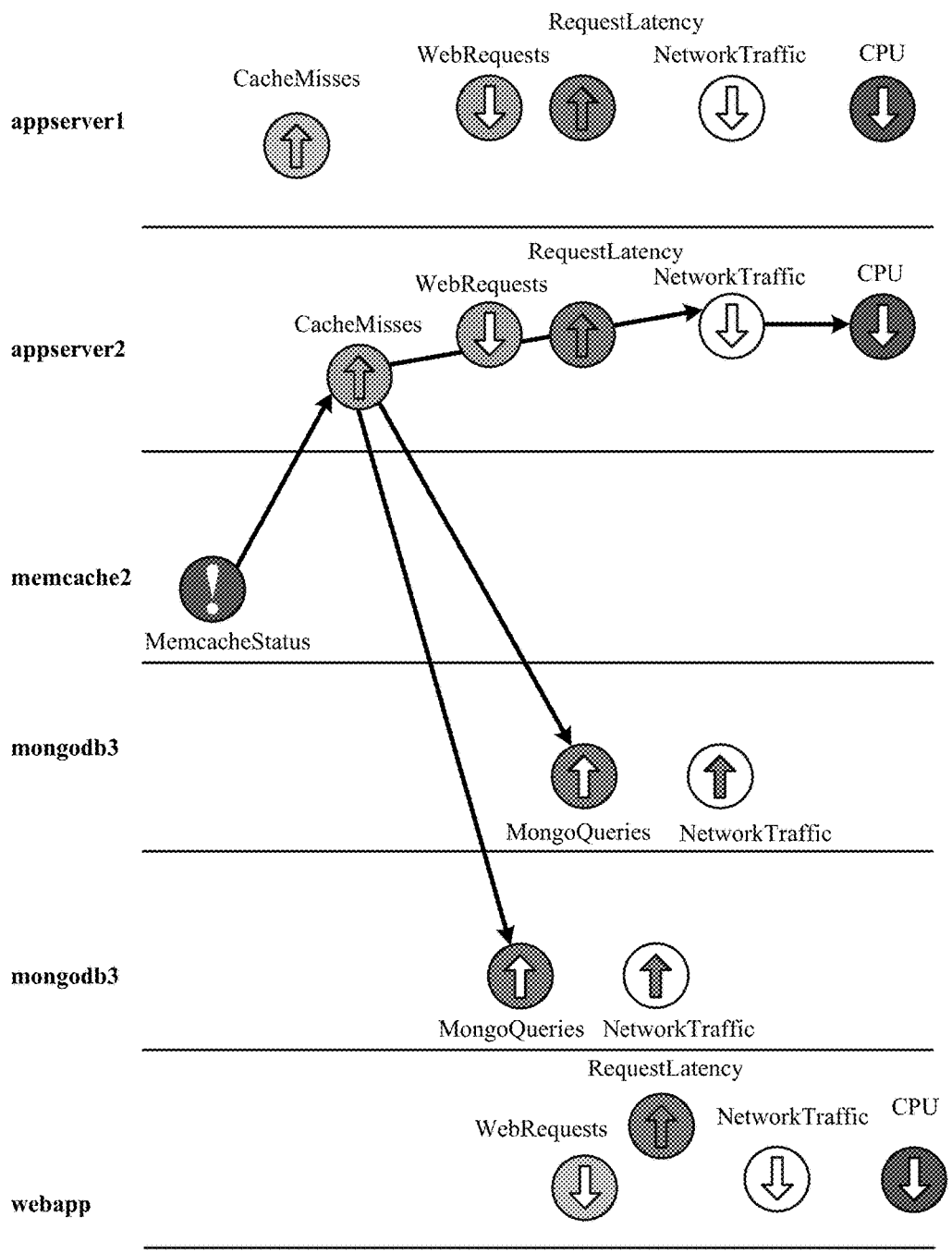
FIG. 3B – Anomaly Impact Graph

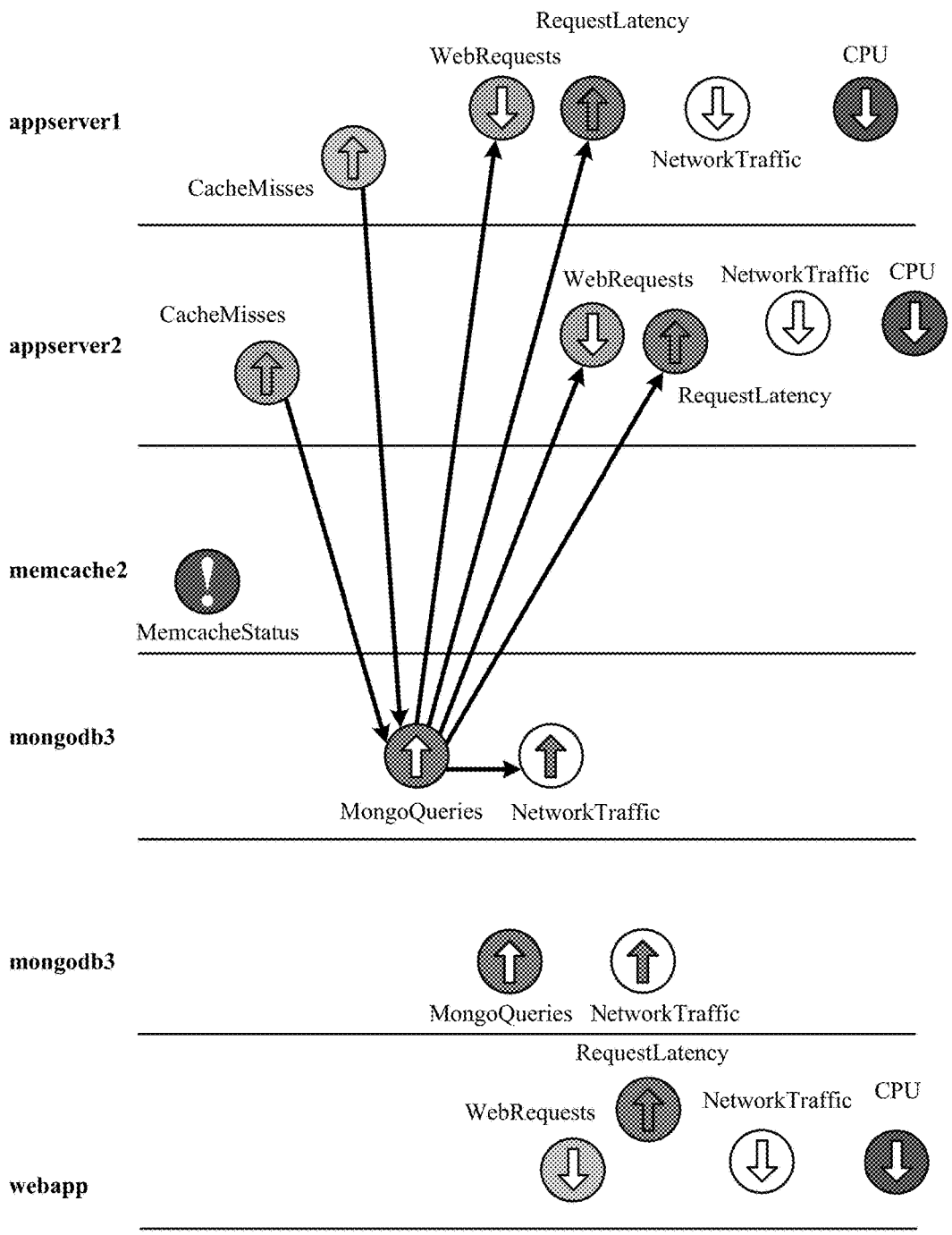
FIG. 3C – Anomaly Impact Graph

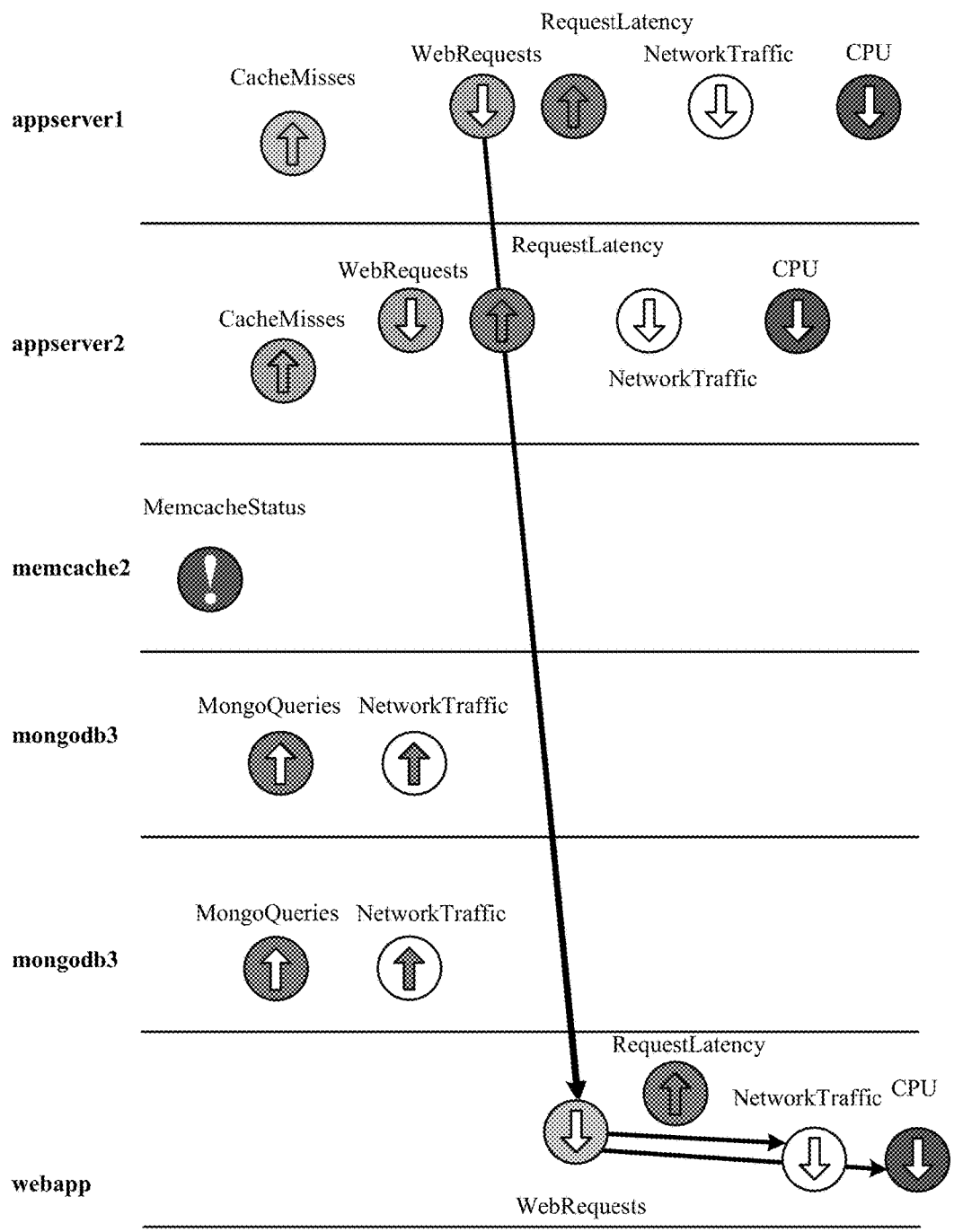
FIG. 3D – Anomaly Impact Graph

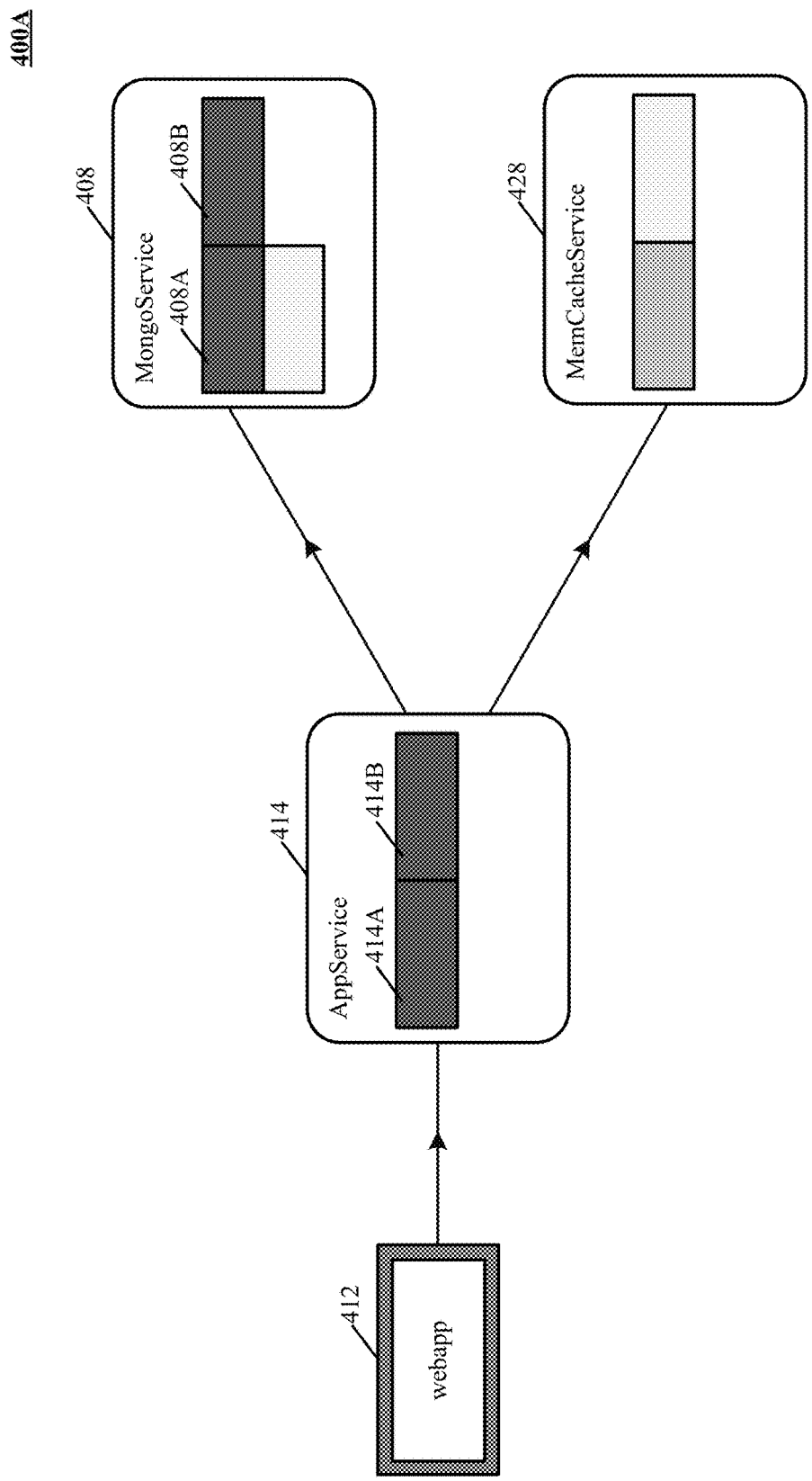
FIG. 4A – Cascading Failures Visualization

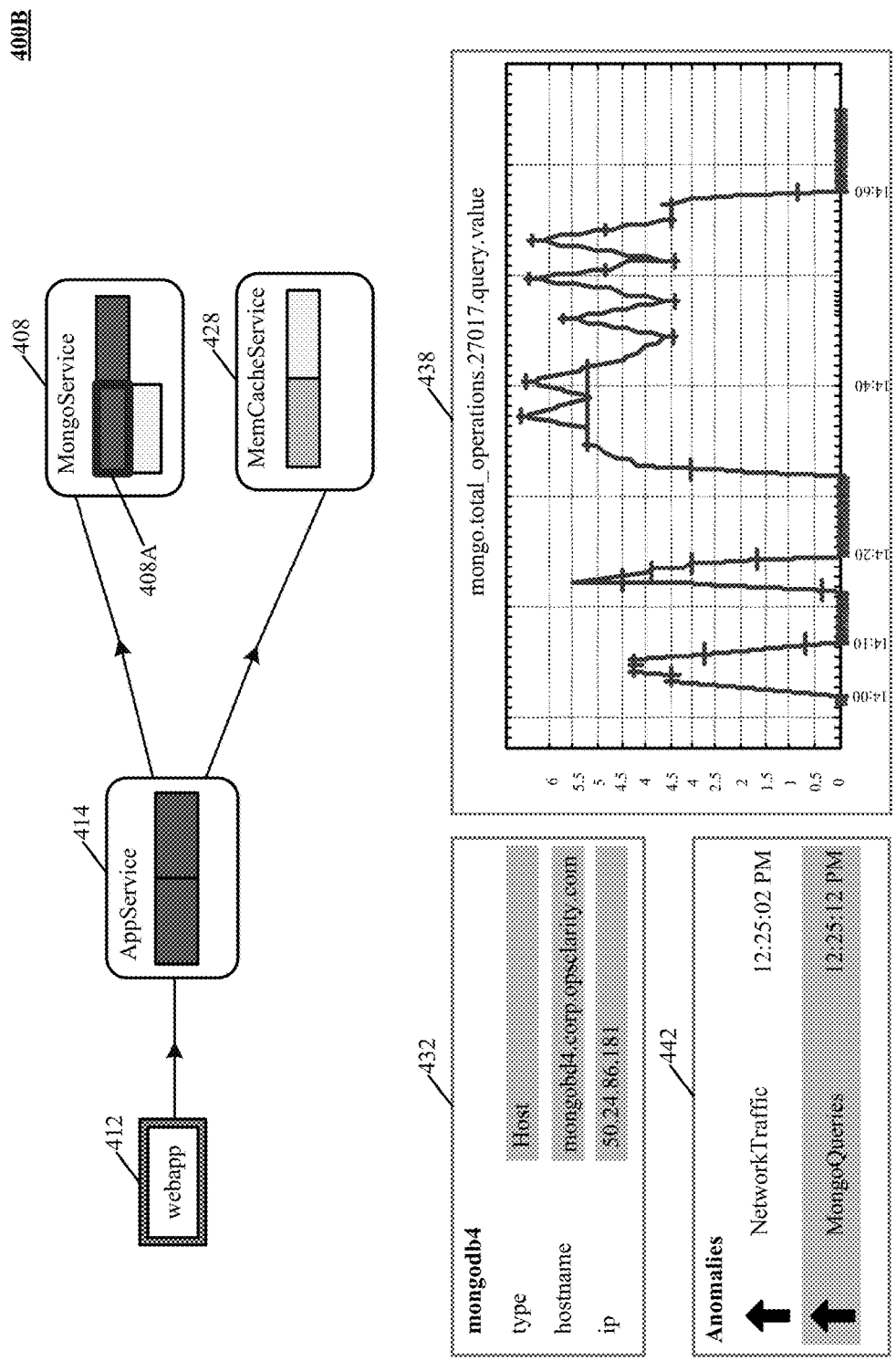
FIG. 4B – Drill Down Access

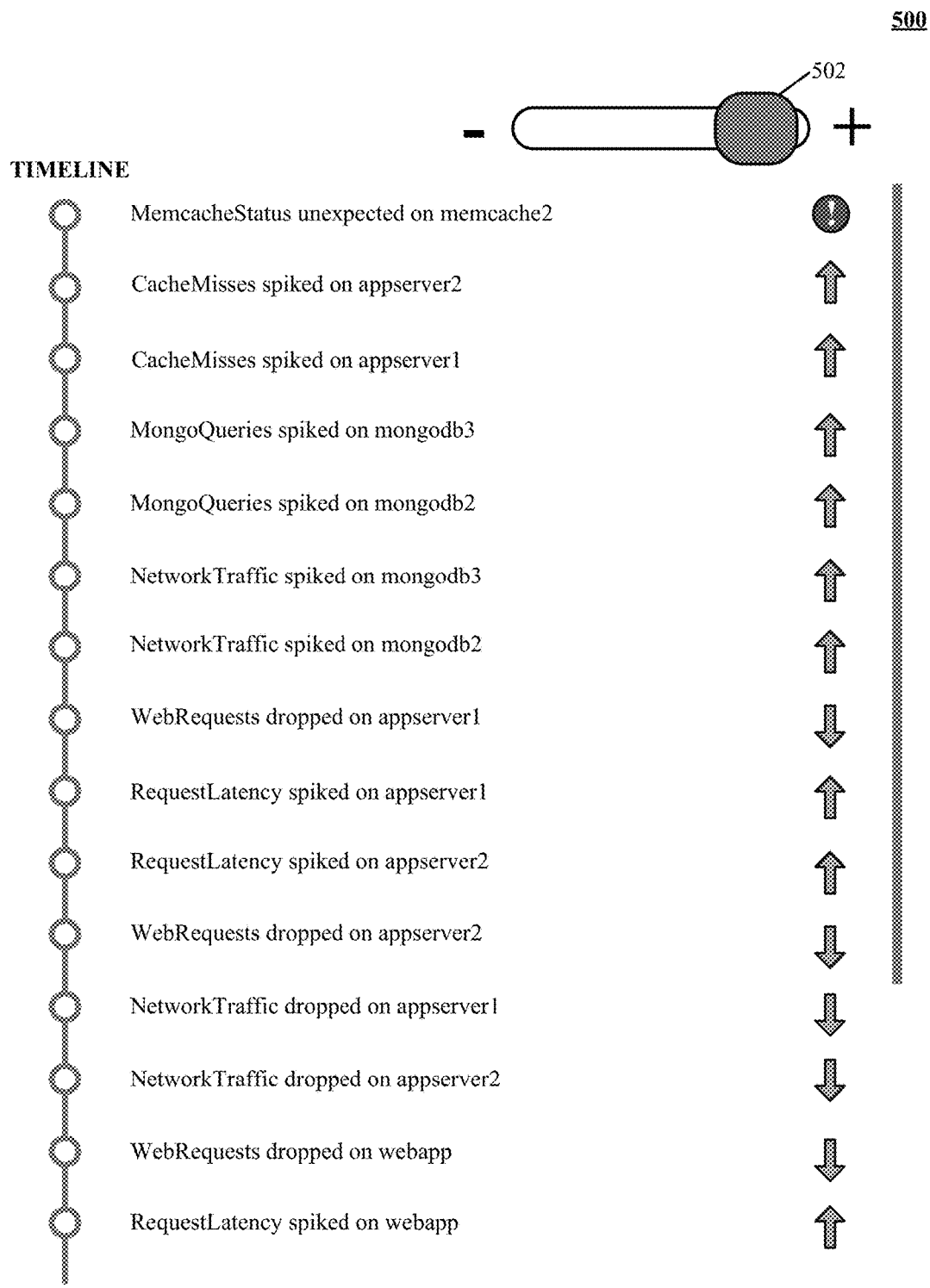
FIG. 5 – Timeline

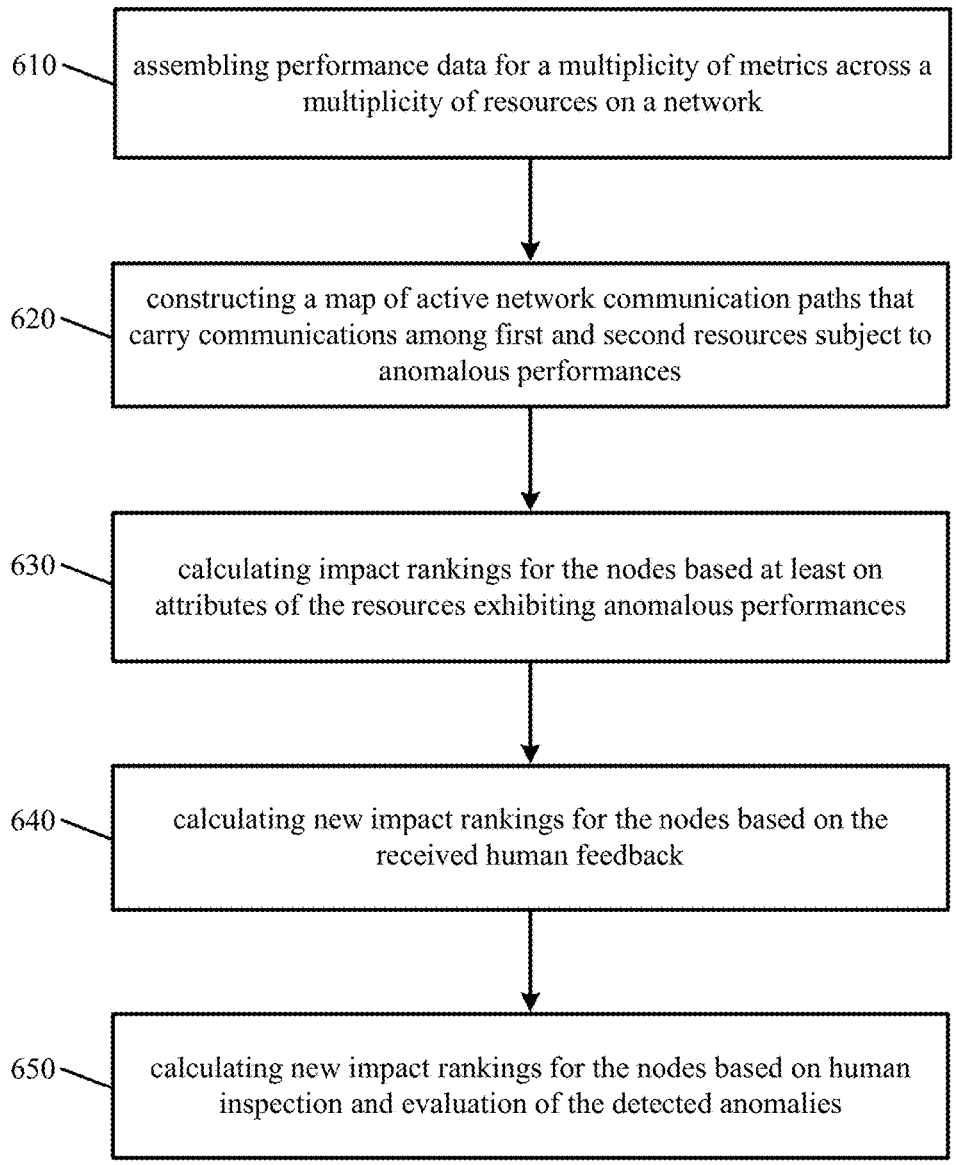
FIG. 6 – Flowchart of Ranking Anomalies in an Anomaly Cluster

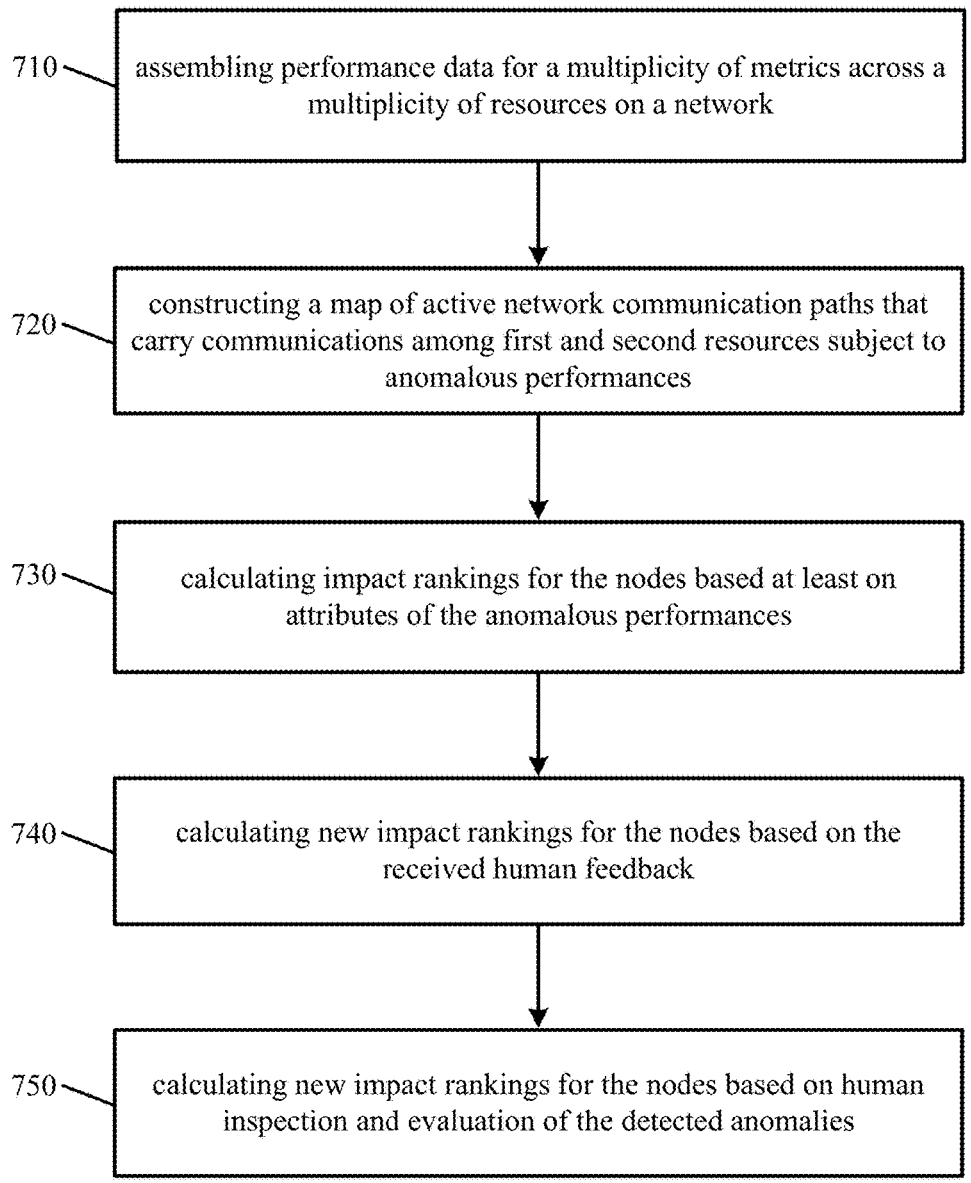
FIG. 7 – Flowchart of Ranking Anomalies in an Anomaly Cluster

_800_

| Anomalies ⁸⁰² | Change ⁸⁰⁴ | Impact ⁸⁰⁶ | Resources ⁸⁰⁸ |
|---|---|---|---|
| CacheMiss | ∧ 20 % | 7 | MyAppSvc, Webapp |
| DiskFree | ∨ 15 % | 6 | Another AppSvc |
| AvgLat | ∧ 10 % | 3 | Mongodb2 |
| AvgQPS | ∧ 7 % | 2 | Mongodb1 |
| AvgDocSize | ∧ 5 % | 1 | Mongodb3 |

FIG. 8 – Ranked Anomalies

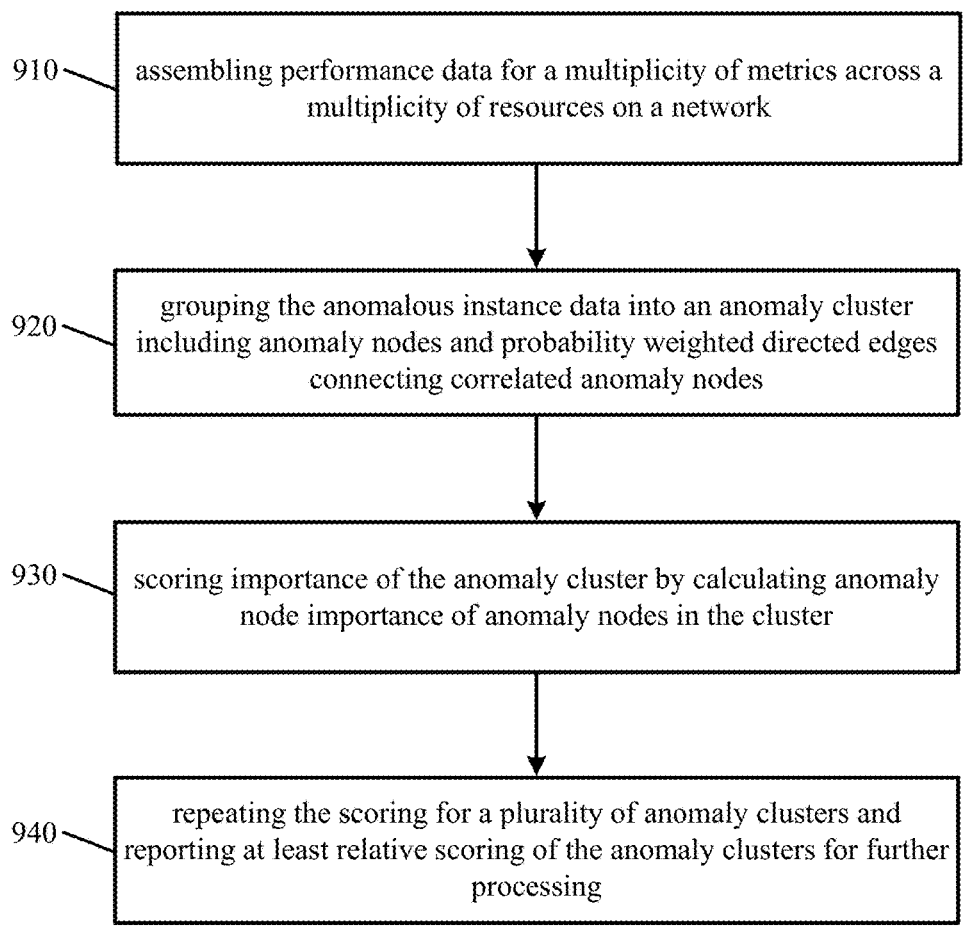
FIG. 9A – Flowchart of Ranking Anomaly Clusters

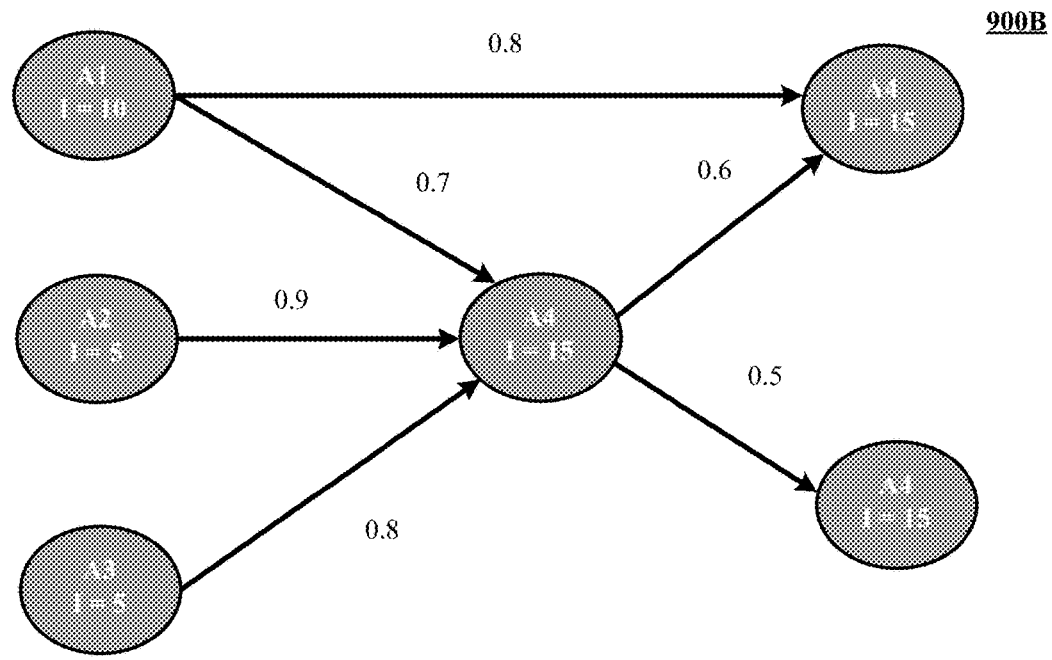
FIG. 9B – Impact Propagation Graph
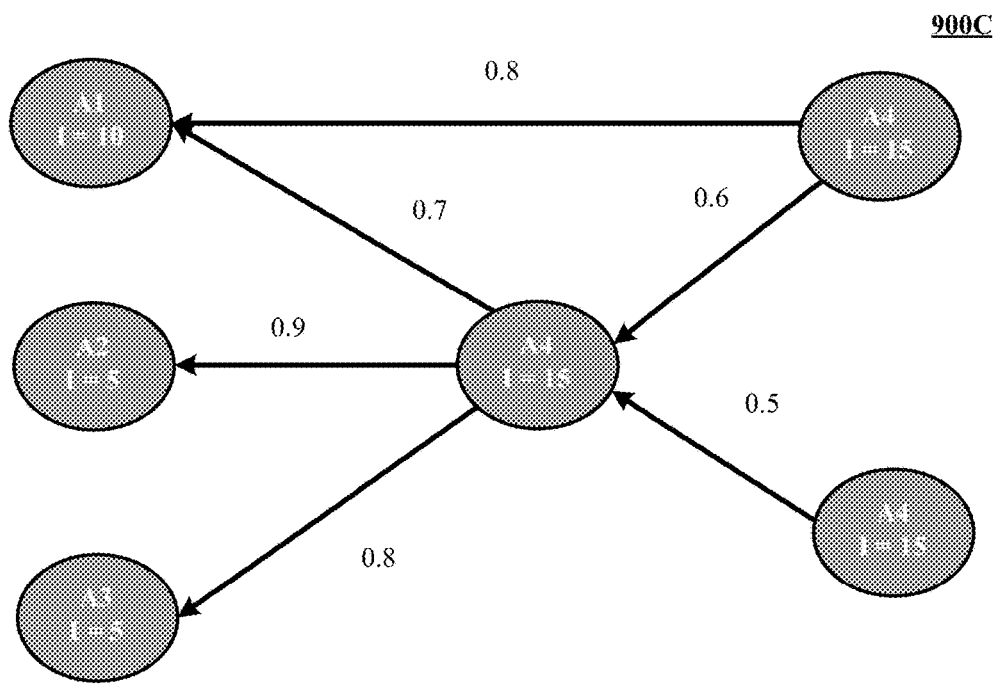
FIG. 9C – Inverse Impact Propagation Graph

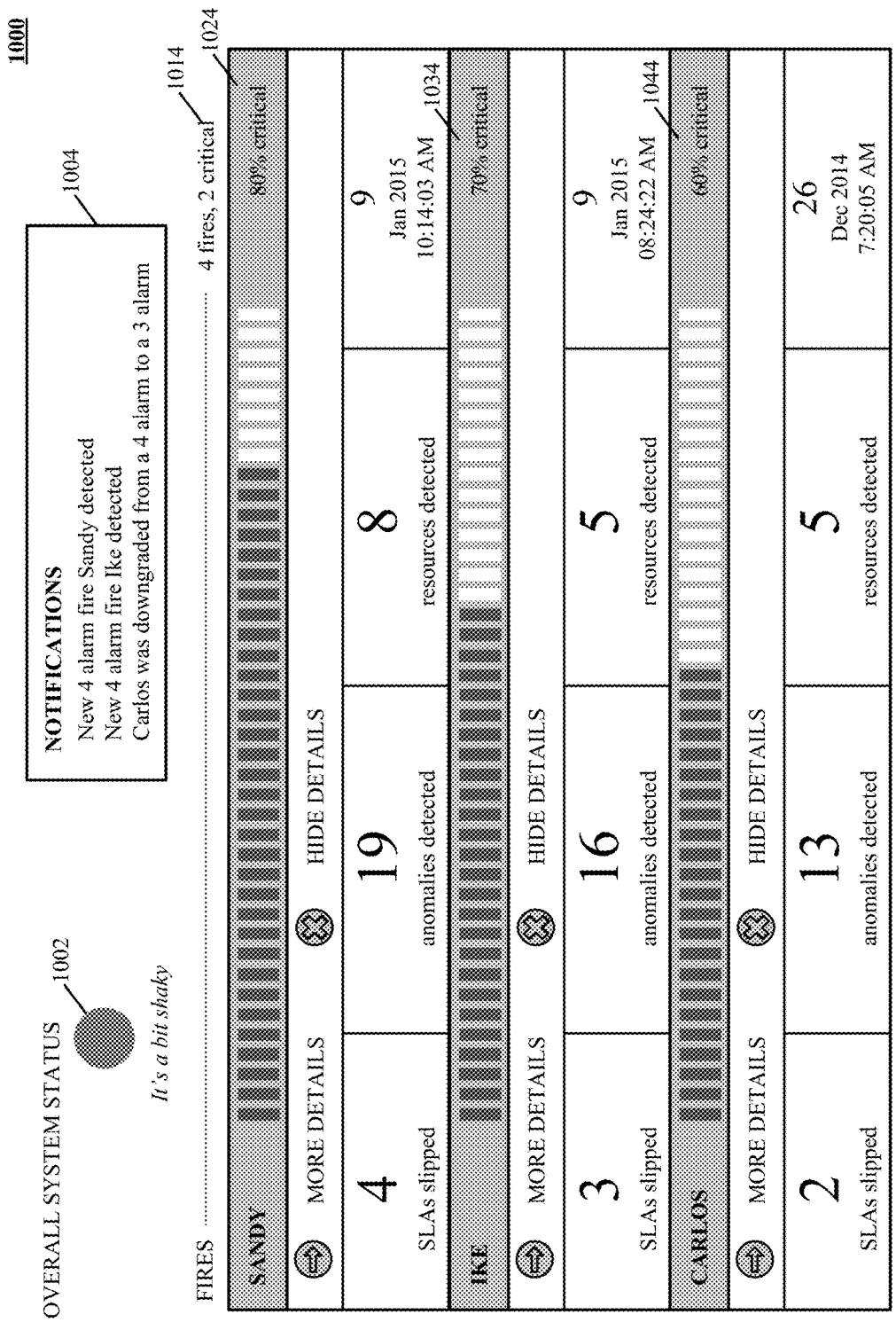
FIG. 10A – Ranked Anomaly Clusters

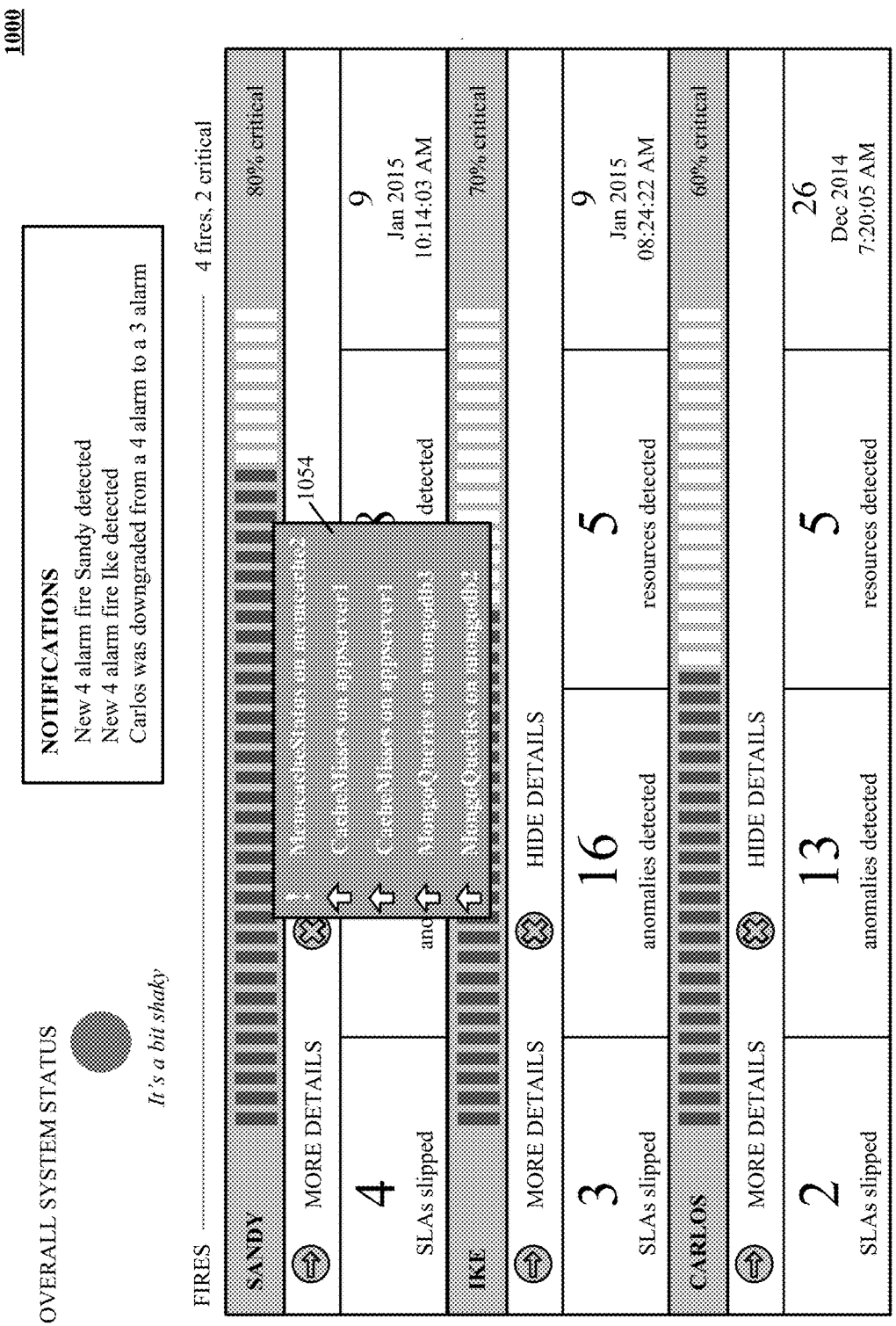
FIG. 10B – Ranked Anomaly Clusters

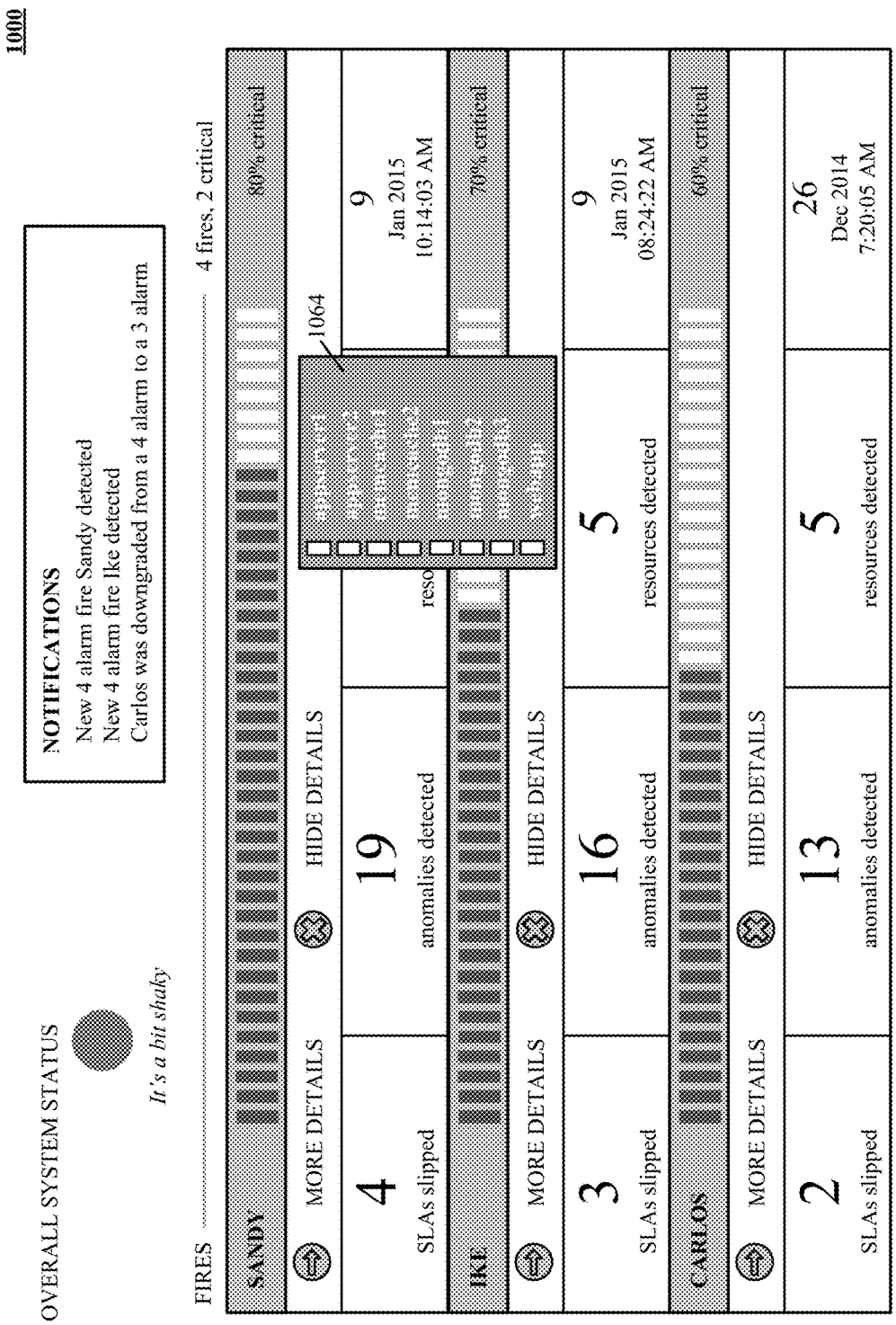
FIG. 10C – Ranked Anomaly Clusters

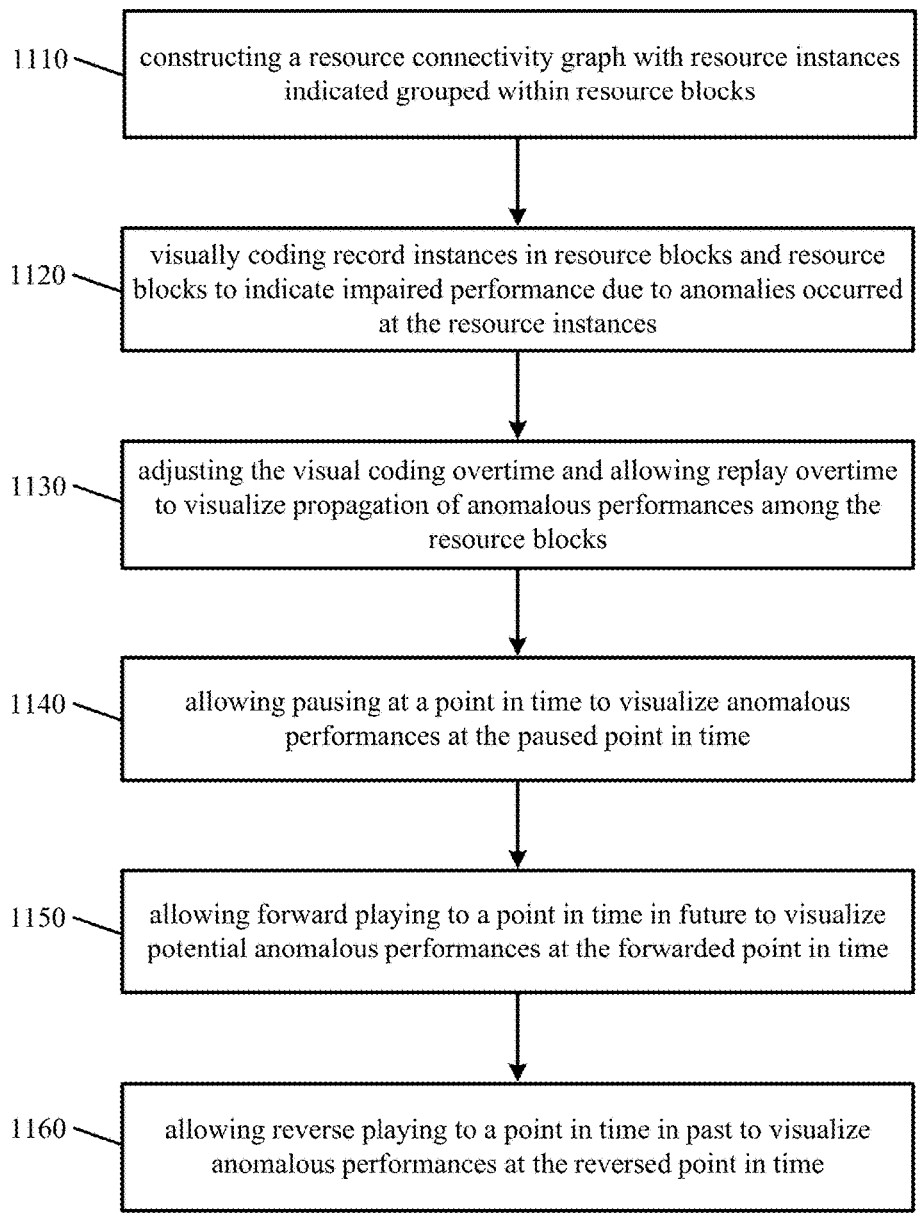
FIG. 11 – Flowchart of Depicting Evolution of Resource Failures across a Network

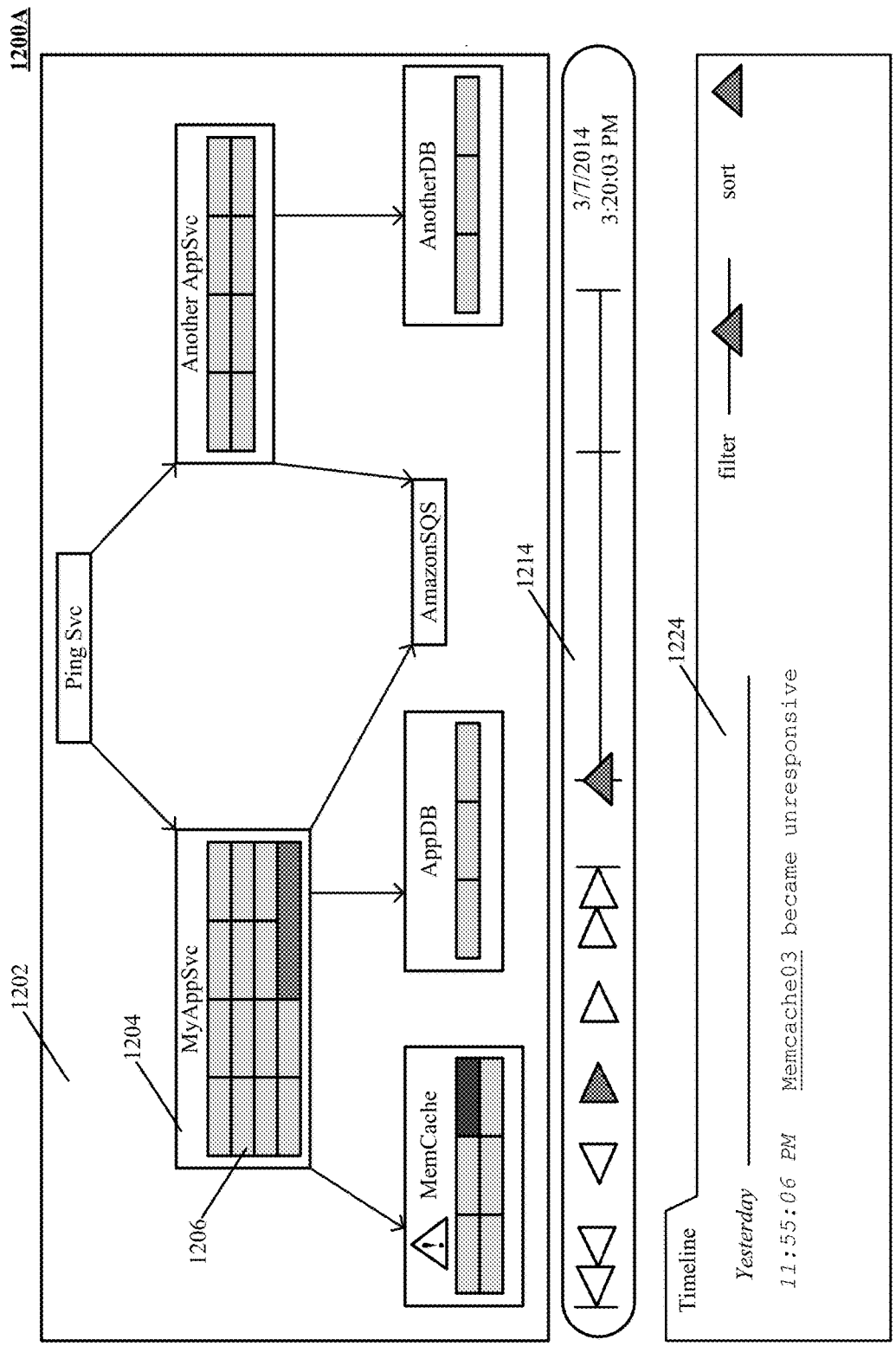
FIG. 12A – Time-Lapsed View

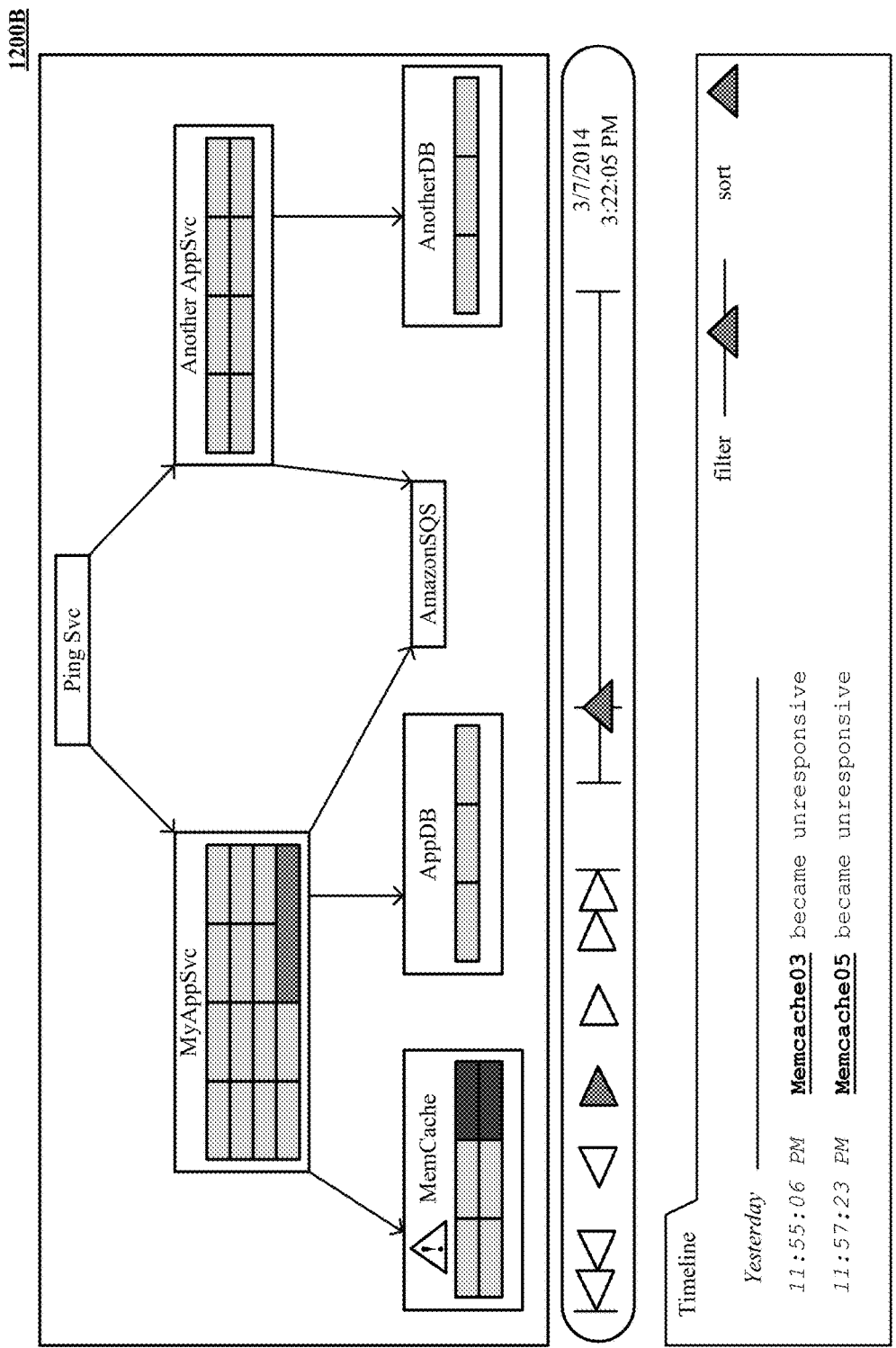
FIG. 12B – Time-Lapsed View

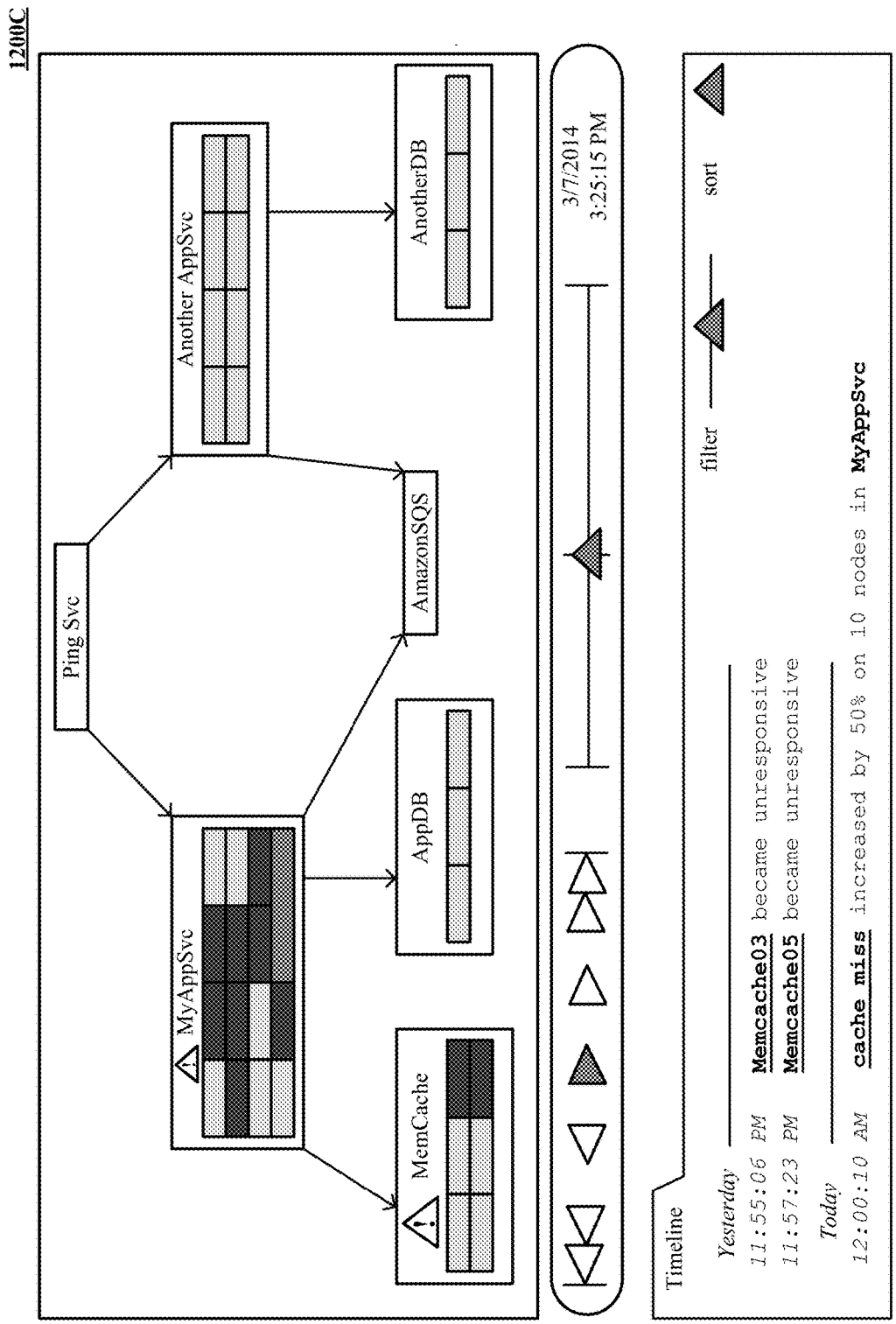
FIG. 12C – Time-Lapsed View

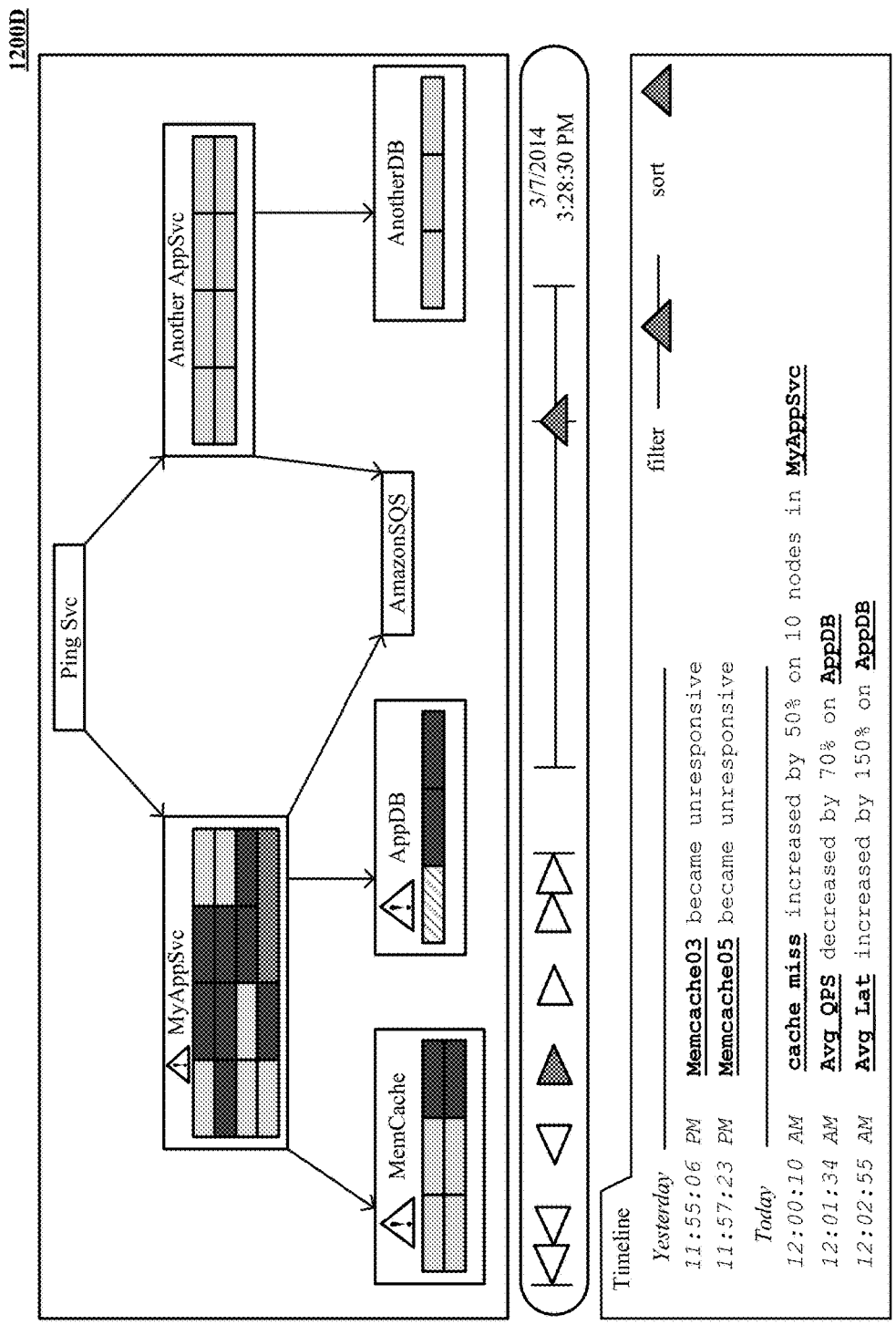
FIG. 12D – Time-Lapsed View

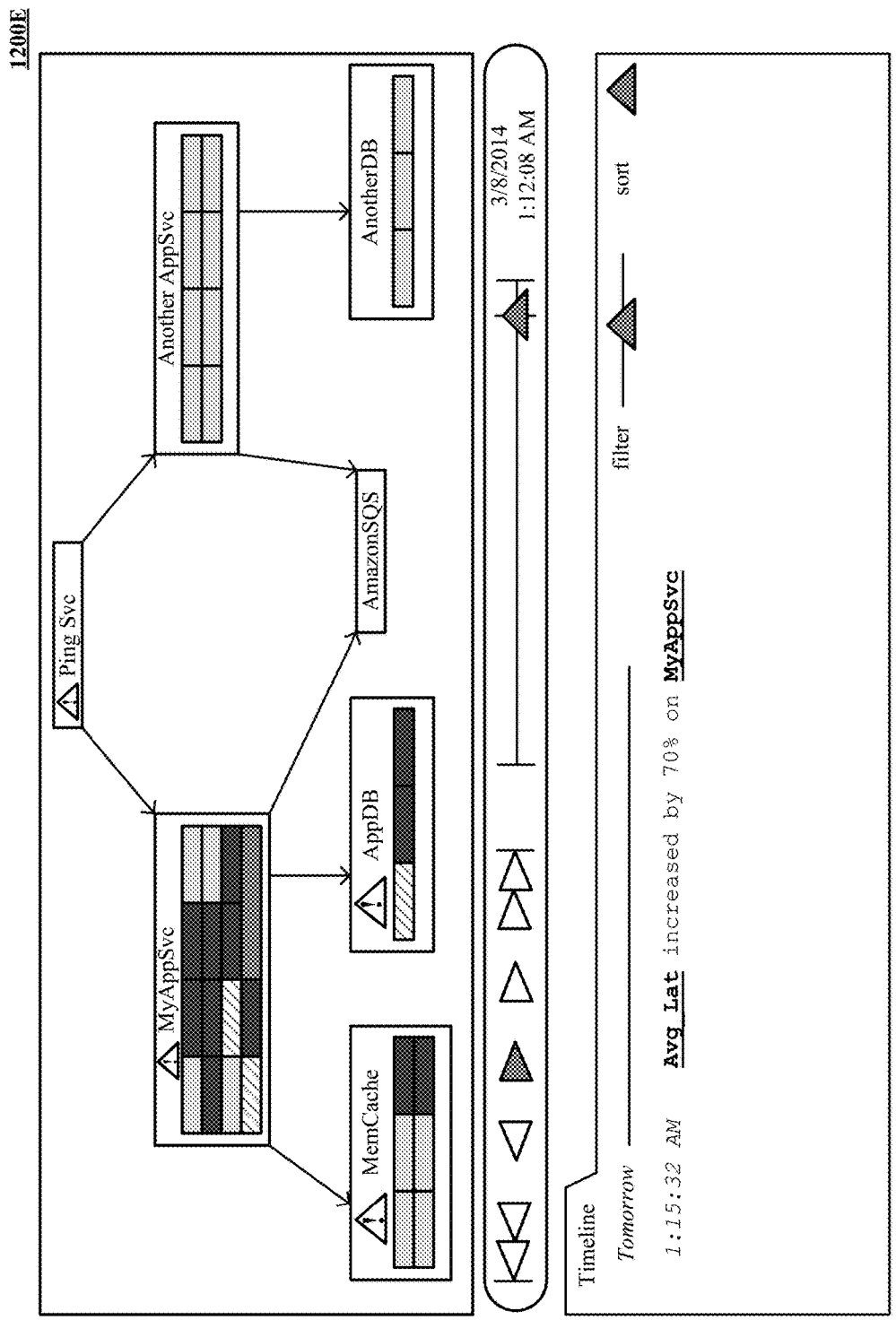
FIG. 12E – Time-Lapsed View

1300

| MetricID | Performance Metric |
|---|---|
| 1124 | Network Traffic |

• 
• Metric Objects 1310
•

| ResourceID | Resource |
|---|---|
| 7361 | webapp |

• 
• Resource Objects 1315
•

| AnomalyID | Anomaly | Impacted Resource |
|---|---|---|
| 541612 | CacheMiss | appserver1 |

• 
• Anomaly Objects 1320
•

| AnomalyID | Start Time | End Time |
|---|---|---|
| 541612 | 12:05:12 AM | 12:013:32 AM |

• 
• Anomaly Lifetime Objects 1325
•

| FailureID | Failure |
|---|---|
| 7361 | Memcache Unresponsive |

• 
• Failure Objects 1330
•

| FailureID | Source Anomaly | Target Anomaly | Source Resource | Target Resource |
|---|---|---|---|---|
| 7361 | Cachemiss | Spike in Request Latency | appserver1 | appserver2 |

• 
• Correlation Objects 1335
•

FIG. 13 – Anomalous Instance Data

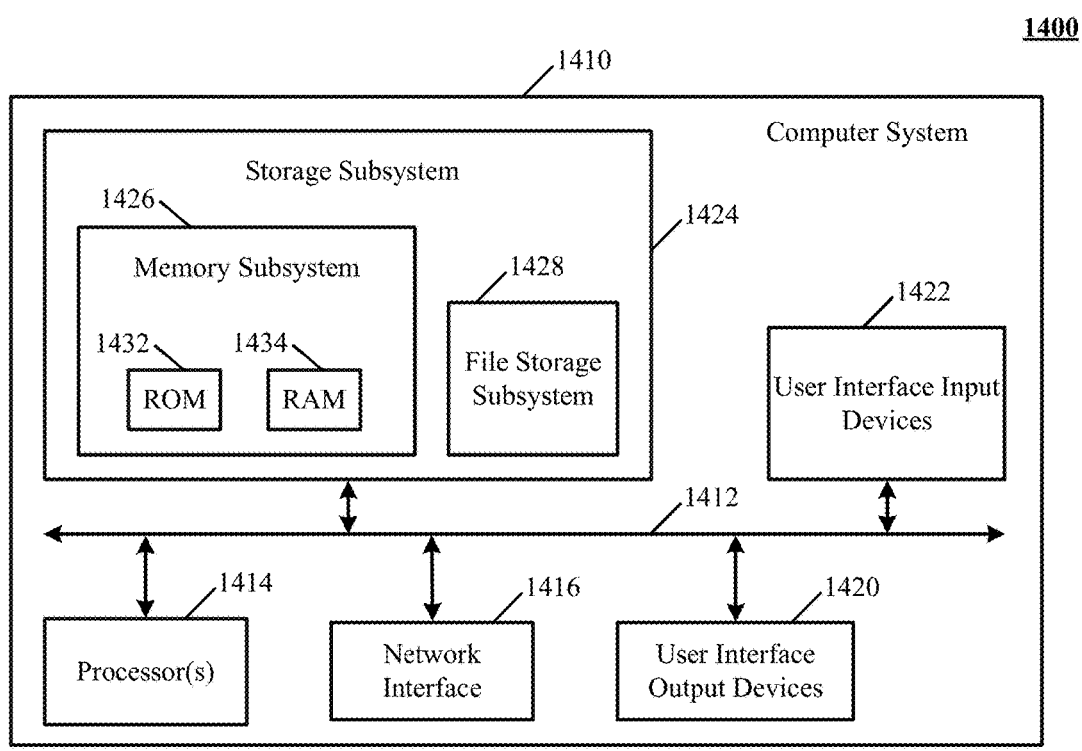
FIG. 14 – Computer System

US 10,454,753 B2

RANKING NETWORK ANOMALIES IN AN ANOMALY CLUSTER

CROSS REFERENCE TO OTHER APPLICATIONS

This application is a continuation of U.S. patent application Ser. No. 14/276,846, entitled "ORGANIZING NETWORK PERFORMANCE METRICS INTO HISTORICAL ANOMALY DEPENDENCY DATA", filed on May 13, 2014, which claims the benefit of three U.S. provisional Patent Applications No. 61/859,279, entitled, "SYSTEM AND METHOD TO FIND CORRELATIONS BETWEEN ANOMALIES (ANY UNEXPECTED CHANGES) DETECTED ACROSS ANY DATA SET, INCLUDING BUT NOT LIMITED TO OPERATIONAL DATA IN INFORMATIONAL TECHNOLOGY SYSTEMS," filed on Jul. 28, 2013; No. 61/859,280, entitled, "SYSTEM AND METHOD TO RANK ANOMALIES (ANY UNEXPECTED CHANGES) DETECTED ACROSS ANY DATA SET, INCLUDING BUT NOT LIMITED TO DATA IN INFORMATIONAL TECHNOLOGY SYSTEMS," filed on Jul. 28, 2013; and No. 61/859,282, entitled, "SYSTEM AND METHOD FOR PRESENTING THE EVOLUTION OF SYSTEM STATE IN AN IT INFRASTRUCTURE (CONSISTING OF A NETWORK OF RESOURCES) OVER TIME," filed on Jul. 28, 2013. The provisional applications are hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The advent of cloud computing and on-line services has led to exponential growth in size and complexity of data centers. This has created unprecedented challenges for system management and monitoring. Given the scale and scope of such large data centers, network operators and monitoring tools are overwhelmed with monitoring and analyzing metrics across several thousand network layers and network elements. Currently, network operators and monitoring tools conduct much of the forensic examination when anomalous behaviors have already occurred by examining protocols or log files of past or recent running processes of the affected devices or applications.

It is therefore necessary to correlate, rank, and visualize these alarms, so as to take timely actions that maintain the service level agreements for the data centers. An opportunity arises to increase automation in network monitoring environments. Improved user experience and engagement and higher customer satisfaction and retention may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 shows an example environment of correlating anomalies in a network.

FIG. 2 is a flowchart showing a method of organizing network performance metrics into historical anomaly dependency data in accordance with implementations of the technology disclosed.

FIGS. 3A-3D illustrate one implementation of an anomaly impact graph that depicts a map of active network communication paths that carry communications among resources subject to anomalous performances.

FIG. 4A shows one implementation of cascading failures visualization that summarizes a chain of cascading failure relationships among resources exhibiting anomalous performances.

FIG. 4B illustrates one implementation of a portal that provides a drill-down access to anomalous performances illustrated in cascading failures visualization.

FIG. 5 is one implementation of a timeline portal that shows how anomalous performance spread in time among the impacted resources.

FIG. 6 depicts a representative method of ranking anomalies in a cluster.

FIG. 7 shows one implementation of a method of ranking anomalies in a cluster.

FIG. 8 illustrates one implementation of an interface of ranked anomalies.

FIG. 9A illustrates one implementation of a method of ranking anomaly clusters.

FIGS. 9B-9C illustrate one implementation of impact propagation mechanism for ranking anomaly clusters.

FIGS. 10A-10C illustrate one implementation of depicting importance of anomaly clusters.

FIG. 11 is a flowchart showing a method of depicting evolution of resource failures across a network.

FIGS. 12A-12E illustrate a time-lapsed view of the cascading failure result links that visualize anomalous performances across resources in a network.

FIG. 13 shows one implementation of a plurality of objects representing anomalous instance data.

FIG. 14 is a block diagram of an example computer system used to organize network performance metrics into historical anomaly dependency data.

DESCRIPTION

Introduction

Anomalies refer to any unexpected changes in a data stream. The technology disclosed can be applied to correlating anomalies in data streams that exist in a variety of applications including, information technology (IT) systems, telecommunications systems, financial systems, security trading, banking, business intelligence, marketing, mining, energy, etc. One implementation of the technology disclosed relates to IT systems operations. IT operational data refers to any data that is produced by any human, system (hardware or software), machine, application, software, or component within an IT environment. Some examples of this operational data include metrics (server, network, database, services, hypervisor), alerts, logs, errors, software pushes, or application topology.

Unexpected changes in operational data i.e. anomalies are important for a number of reasons such as understanding the health of the system, alerting for system failures, or identifying the cause and symptoms for failures. One particular use of anomalies is to identify the most likely cause and symptom of system failures, and thereby enable faster resolution of these system failures. Any non-trivial system or data stream can have several anomalies in progress at any given time and manually inspecting all anomalies to identify the actual cause of a failure can be a very time-consuming, cumbersome, and error prone process. Therefore, systems and methods that correlate anomalies across a network and identify the different relationships among the correlated anomalies can be very useful to network operators and end consumers.

As the scale and complexity of a network grows, the number of detected anomalies and alarms about the detected anomalies raised by the network monitoring tools also increase. As a result, the task of identifying root causes of the anomalies and mitigating them becomes unmanageable. The technology disclosed allows for ranking of detected anomalies or anomaly clusters that enables network operators to focus on most critical true positives and not be distracted by false alarms. Using the technology disclosed, the large number of alerts raised in large data centers can be efficiently ranked to help the network operators and monitoring tools to filter out false positives and direct management resources to the most critical problems in the network.

IT infrastructures tend to be dynamic and constantly changing. There are many ways of representing systems state for any particular snapshot of time, such as graphs of various resource metrics (e.g. network bandwidth, CPU utilization, etc.), resource topologies, health dashboards, etc. However, currently, there is no good way to see how such system states evolve over time. The technology disclosed generates an evolution map of system states in real-time that is presented to user for user interaction, allowing: determination of root causes of failures in complex systems, understanding of live and real-time behavior of a complex system for purposes of identifying performance and scaling bottlenecks; preserving a record of the evolution of system state for post mortem analysis; and predicting future failures of a complex system.

The technology disclosed also allows for proactive notification of potential bottlenecks in the network. Timely and accurate bottleneck anomaly detection along with effective notification can lead to quicker resolution of network faults, and thus proactively prevent large numbers of end-users from experiencing service failures.

Examples of systems, apparatus, and methods according to the disclosed implementations are described in an information technology context. In other instances, the technology disclosed may be applied to fraud detection, telecommunications systems, financial systems, security trading, banking, business intelligence, marketing, mining, energy, etc. Other applications are possible, such that the following examples should not be taken as definitive or limiting either in scope, context or setting.

The technology disclosed relates to correlating, ranking, and visualizing anomalies in a network by using computer-implemented systems. The technology disclosed can be implemented in the context of any computer-implemented system including an on-demand database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

As used herein, a given signal, event or value is "dependent on" a predecessor signal, event or value of the predecessor signal, event or value influenced by the given signal, event or value. If there is an intervening processing element, step or time period, the given signal, event or value can still be "dependent on" the predecessor signal, event or value. If the intervening processing element or step combines more than one signal, event or value, the signal output of the processing element or step is considered "dependent on" each of the signal, event or value inputs. If the given signal, event or value is the same as the predecessor signal, event or value, this is merely a degenerate case in which the given signal, event or value is still considered to be "dependent on" or "based on" the predecessor signal, event or value. "Responsiveness" of a given signal, event or value upon another signal, event or value is defined similarly.

Anomaly Correlation Environment

FIG. 1 shows an example environment 100 of correlating anomalies in a network. FIG. 1 includes an anomalous instance data store 102, baseline data store 108, and user feedback data store 122. FIG. 1 also shows assembly engine 105, detection engine 135, correlation engine 112, ranking engine 118, graphics engine 125, user computing device 128, application 126, and network(s) 115. In other implementations, environment 100 may not have the same elements or components as those listed above and/or may have other/different elements or components instead of, or in addition to, those listed above, such as a performance metrics data store, crowd sourced data store, or detection engine. The different elements or components can be combined into single software modules and multiple software modules can run on the same hardware.

In some implementations, network(s) 115 can be any one or any combination of Local Area Network (LAN), Wide Area Network (WAN), WiMAX, WiFi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

In some implementations, the engine can be of varying types including a workstation, server, computing cluster, blade server, server farm, or any other data processing system or computing device. The engine can be communicably coupled to the databases via a different network connection. For example, assembly engine 105 and correlation engine 112 can be coupled via the network 115 (e.g., the Internet), ranking engine 118 can be coupled via a direct network link, and graphics engine 125 can be coupled by yet a different network connection.

In some implementations, data stores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, user computing device 128 can be a personal computer, laptop computer, tablet computer, smartphone, personal digital assistant (PDA), digital image capture devices, and the like.

Application 126 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on-premise environment. In one implementation, application 126 can be accessed from a browser running on a computing device. The browser can be Chrome, Internet Explorer, Firefox, Safari, and the like. In other implementations, application 126 can run as an engagement console on a computer desktop application.

Assembly engine 105 characterizes network events by composing daily cycles of network traffic behavior and automatically generating different profiles of repetitive behavior or normal operating range, referred to as "baseline." In one implementation, assembly engine 105 collects statistical samples of traffic data from a multiplicity of resources for different metrics by receiving incoming data stream from the resources as a series of data packets. In some implementations, such samples are exchanged through physical interfaces that employ Layer 2 technologies like Ethernet or Packet Over SONET (POS) framing. In another implementation, assembly engine 105 extracts performance metrics for the different resources (routers, switches, firewalls, load balancers, servers, applications) from the received data stream. Examples of performance metrics include bandwidth, packets per second, connections per second, maximum concurrent connections, bits per second, errors, dropped packets, flows per second, round trip time (RTT), web requests, jitter, or transactions per second.

For instance, assembly engine 105 periodically retrieves "network events" data from application servers in a network. A baseline is then automatically constructed that represents the normal operating range for the network traffic and stored in baseline data store 108. In one example, performance metrics such as packets per second and connections per second are collected every two minutes to monitor the network traffic during business hours only (e.g. 9:00 am to 5:00 pm). In this example, assembly engine 105 collects performance metrics that were collected during business hours over a sliding window of time such as a week or month. These extracted performance metrics are the raw data that represent the baseline of network traffic data over the sliding window of time. The assembly engine 105 then performs statistical analysis on the raw data to generate a representation of the normal operating range of network traffic during the sliding window of time.

In one implementation, anomalous performances are detected using threshold-based techniques to flag outliers. According to such an implementation, detection engine 135 detects anomalies by comparing values of extracted performance metrics with previously calculated current normal thresholds for the performance metrics. If the values are outside their performance metric's normal limits i.e. baseline, anomalies are detected and stored as anomalous instance data 102. In some implementations, values of extracted performance metrics are compared to service level thresholds that represent the level at which a defined service level for a performance metric is out of bounds. When the values of extracted performance metrics reach or exceed corresponding service level thresholds, service level exceptions are triggered. According to other implementations of the technology disclosed, anomalies are detected using at least one or combination of statistical anomaly detection (unsupervised anomaly detection like multivariate auto regression analysis), data mining, or machine learning based techniques (supervised anomaly detection, semi-supervised anomaly detection).

Once the anomalies are detected, they are grouped into anomaly clusters by the detection engine 135. In some implementations, detection engine 135 aggregates performance metrics and clusters the detected anomalies based on spatial network topology. In other implementations, detection engine 135 clusters detected anomalies based on inter-anomaly time spacing i.e. proximate anomaly occurrence times. In some implementations, detection engine 135 detects anomalies at a network-path level or network-wide level by analyzing end-to-end one-way delay, throughput measurement time series, router logs, maintenance activity logs, or command histories. Such anomalies occur as spikes, dips, bursts, persistent variations, or plateau variations in network performance metrics. For instance, anomalies occurring on resources that share common network segments have a certain spatial relation between each other. When anomalies occur on such resources around the same time window, detection engine 135 groups them into anomaly clusters.

Correlation engine 112 organizes anomalies in anomaly clusters into anomaly dependency data. In one implementation, correlation engine 112 correlates anomalies based on physical and/or logical topology of resources (wireless devices, switches, routers, firewalls, servers, databases) in the network. In one implementation, physical topology refers to the geometric shape of the layout of the physical resources used in the network. In another implementation, logical topology represents active communication paths of data flow among the resources in the network. Examples of logical network topologies include point-to-point, bus, ring, star, tree, mesh, daisy chain, or hybrid.

In one example, a network 115 includes load-balancing functionality, such as round-robin HTTP request distributors to balance loads and distribute incoming HTTP requests evenly over a plurality of HTTP servers. Furthermore, each of the plurality of HTTP servers has access to one or more on-demand databases. In this example, if one of the mongo databases suffers an update anomaly due to redundancy in the relations, then it causes cache misses at the corresponding HTTP servers, which in turn results in substantial dips in HTTP requests at the HTTP request distributors. Correlation engine 112 uses the network topology information to identify the spatial relationship (load-balancing functionality) among the HTTP servers, the on-demand databases, and the HTTP request distributors and treats the anomalies occurring on the HTTP servers as a consequence of the anomalies detected on the other two resources.

In another implementation, correlation engine 112 uses time-stamped anomaly instance data to correlate anomalies that occur within a time constant. For instance, anomalies occurring on the same router and at the same time like CPU spikes and link down events are determined to be correlated by the correlation engine 112 if they occur and/or disappear within a time constant $T_1$, as explained later in this application.

In yet another implementation, correlation engine 112 correlates anomalies based on historical co-occurrence of the anomalies. According to such an implementation, if there are historical patterns between occurrence and/or disappearance of the anomalies within a time constant, then correlation engine 112 identifies them as correlated anomalies. For example, every time anomaly a1 occurred in the last n observation cycles, anomaly a2 followed within five minutes with a ninety-nine percent probability, then anomaly a1 is determined to have causality relationship with anomaly a2.

Some other implementations include correlation engine 112 identifying anomaly dependency data based on at least explicit and/or implicit user feedback on whether anomalies are correlated and/or user behavior observations, which are stored in user feedback data store 122. In some implementations, user feedback is assembled by displaying the results of anomaly correlation to the users and receiving user evaluation of the results through a keyboard and a pointing device (e.g., a mouse or a trackball). In other implementations, user evaluation is received through visual feedback, auditory feedback, gestural feedback, or tactile feedback. The received user feedback is maintained in user feedback data store 122 and automatically updated over time, according to one implementation. Yet other implementations include correlating anomalies dependent on degrees of severity of the detected anomalies.

Ranking engine 118 ranks detected anomalies into relative ordering based on different attributes of the anomalous performances such degrees of impact of the anomalous performances, percentage difference between the anomalous performances and corresponding baseline values, or duration of the anomalous performance, according to one implementation. In another implementation, anomalies are ranked dependent on the attributes of the resources on which they occurred. Examples of such attributes include visibility of the resources, conditions of service level agreements violated by anomalous performances of the resources, or redundant availabilities of the resources. Yet other implementations include ranking engine 118 prioritizing anomalies responsive to user feedback provided across the user computing device 128.

In some implementations, ranking engine 118 ranks a series of anomalies called "anomaly clusters" detected during a time window and across a set of network resources, referred to as "fires." Such implementations include calculating relative scoring of the anomaly clusters based on the number of correlated anomalies in the anomaly clusters and/or the number of resources affected by the correlated anomalies.

Graphics engine 125 generates for display animated and interactive visual representations of information generated, exchanged, stored or extracted in the anomaly correlation environment 100 by it different elements or components, such as anomalous instance data store 102, baseline data store 108, user feedback data store 122, assembly engine 105, detection engine 135, correlation engine 112, ranking engine 118, or graphics engine 125. In one implementation, such visual representations are presented to users via user computing device 128 and/or application 126.

In one implementation, visual representations generated by graphics engine 125 include graphic elements that are linked to the resources in the network 115 and depict the spatial and temporal relationships among the resources. In another implementation, graphics engine 125 generates for depiction different relationships (casual, responsive, dependent) between the anomalies occurred at the various resources and the impacts made by the anomalous performances on the resources, which use text, graphical, or sequences of communications so as to clearly establish the order of anomalies in real-time and/or over-time.

In some implementations, graphics engine 125 generates for display anomaly clusters i.e. "fires" using visual schemes to indicate the severities of the fires. Examples of visual schemes include color coding, number of filled or open bars, dimming effects, and distinctive shapes. In other implementations, graphics engine 125 generates for display a visualization of evolution of anomalous performances over time on horizontal axis and updates the visualization to represent temporal changes. In some other implementations, it shows a time-lapsed view of how anomalous performances spread across the impacted resources by color coding them, which can be played back to show historical changes in the network 115. In yet another implementation, the time-lapsed view can be played forward to view predicted anomalous performances at impact-prone resources. In such an implementation, predicted anomalous performances are distinguished from detected anomalous performances such that predicted anomalous performances are visualized with a dimming effect whose intensity is a negative function of the causality levels of the predicted anomalous performances.

Some other implementations include graphics engine 125 generating for display a "heat map" that illustrates anomaly-intensity at the impacted resources and the directionality of anomalous performances from source resources to target resources. In one implementation, graphics engine 125 uses various patterns, colors, or color intensities to visually distinguish between affected and unaffected resources and between different degrees of severity of the detected anomalies calculated using various anomalous weights, values or scores.

Anomaly Correlation

FIG. 2 is a flowchart 200 showing a method of organizing network performance metrics into historical anomaly dependency data in accordance with implementations of the technology disclosed. Flowchart 200 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 2. Multiple actions can be combined in some implementations. For convenience, this flowchart is described with reference to the system that carries out a method. The system is not necessarily part of the method.

At action 210, performance data is assembled for a multiplicity of metrics across a multiplicity of resources on a network. Also, criteria are automatically set over time based on the performance data that qualifies a subset of the performance data as anomalous instance data, according to one implementation.

At action 220, a map of active network communication paths that carry communications among first and second resources subject to anomalous performance is constructed. Also, the active network communication paths are represented as edges between nodes representing first and second resources, thereby forming connected node pairs, according to one implementation.

At action 230, cascading failure relationships are calculated from time-stamped anomaly instance data for the connected node pairs. In one implementation, the cascading failure relationships are based at least in part on whether conditional probabilities of anomalous performance of the second resources given prior anomalous performance of the first resources exceed a predetermined threshold. In one implementation, conditional probabilities refer to statistical measures of likelihood such as a ratio or a joint probability function. In another implementation, they refer to non-statistical measures like a score or a measure derived from expert discretion. In some implementations, the time-stamped anomaly instance data identifies start times and/or end times of anomalous performances of the first and second resources. In one implementation, when the start times of anomalous performances of the first and second resources are within a predetermined time period, anomalous performance of the second resource are automatically represented as a cascading failure resulting from the anomalous performance of the first resource. In other implementations, when the end times of anomalous performances of the first and second resources are within a predetermined time period, anomalous performance of the second resource are automatically represented as a cascading failure resulting from the anomalous performance of the first resource.

At action 240, the anomalous performance of the second resource is automatically represented as a cascading failure resulting from the anomalous performance of the first resource when the calculated conditional probabilities of the second resource anomalies exceed the predetermined threshold.

At action 250, visual representation data that data summarize a chain of cascading failure relationships related to a first group of anomalous instance data are prepared and forwarded for viewing. In one implementation, visual representation data include a count of the first and second resources involved in the chain of cascading failure relationships. In another implementation, visual representation data graphically depict the first and second resources impacted by the chain of cascading failure relationships that arrange the first and second resources along a timeline and show how anomalous performances spread in time among the impacted first and second resources. In yet another implementation, the visual representation data include replay controls that allow a user to filter, by beginning and ending time, the depiction of the chain of cascading failure relationships along the timeline.

In other implementations, the visual representation data include graphic depiction of predicted impacts on additional resources not yet impacted, based at least on active network communication paths that carry communications among first and second resources and the additional resources not yet impacted and the calculated conditional probabilities applied to detected anomalous instance data.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as anomaly detection environment, anomaly clustering algorithms, anomaly graphical interface, or anomaly data structures.

In one implementation, the method includes grouping connected node pairs and patterns of anomalous instance data at the connected node pairs for calculating the conditional probabilities. In another implementation, the method includes processing data that equates groups of connected node pairs as having similar operating relationships and calculating the conditional probabilities for the groups of connected node pairs.

In some implementations, the method includes calculating cascading failure relationships based at least in part on historical frequency of anomalous performance of the second resources given prior anomalous performance of the first resources. In other implementations, the method includes presenting groups of connected node pairs and calculated cascading failure relationships for expert human ratification or rejection.

Other implementations of the method can include a non-transitory computer readable storage medium storing instructions executable by a processor to perform any of the methods described above. Yet another implementation may include a system including memory and one or more processors operable to execute instructions, stored in the memory, to perform any of the methods described above.

Anomaly Impact Graph

FIGS. 3A-3D illustrate one implementation of an anomaly impact graph 300 that depicts a map of active network communication paths that carry communications among resources subject to anomalous performances. In particular, FIGS. 3A-3D show an anomaly impact graph interface 300 that depicts a cluster of operation anomalies that are interrelated as cascading failures. Anomaly impact graph interface 300 can be used to illustrate to a network administrator causes of system failure, according to one implementation. In other implementations, anomaly impact graph interface 300 may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware.

An anomaly impact graph 300 refers to at least one of identification of anomalous performances in a network, or causes of system failures, or dependencies among anomalies in a network. In FIGS. 3A-3D, nodes $302_n$ represent anomalous instance data for different resources (appserver1 and appserver2) and edges $304_n$ between the nodes $302_n$ represent active network communication path data for communications among appserver1 and appserver2, thereby forming connected node pairs in the shown plot. In one implementation, the cluster of operation anomalies that are interrelated as cascading failures are depicted as nodes $302_n$ and anomaly impact graph 300 shows a progression over time of the cascading failures for the connected node pairs to identify one or more root causes of the cascading failures. In another implementation, nodes $302_n$ are proximate in time and connected by edges $304_n$ that represent cascading failure result links. In yet another implementation, a user can select one or more edges that the user desires to inspect. In such an implementation, inspected edges can be brighten, highlighted, or bolded like edges $304_n$ while unselected edges are dimmed or greyed like edges $306_n$.

As shown in the example used in FIGS. 3A-3D, an unexpected status at memory cache 2 (memcache2) causes a spike in cache misses at application server 1 (appserver1) and application server 2 (appserver2). This results in spike in mongo queries (mongoqueries) on mongo database 3 (mongodb3) and mongo database 2 (mongodb2), which in turn causes spike in network traffic at the two databases. Consequently, network traffic at appserver1 and appserver2 drops, which causes dip in network traffic at the consumer facing web application (webapp).

Resource Impact Graph

FIG. 4A shows one implementation of cascading failures visualization 400A that summarizes a chain of cascading failure relationships among resources exhibiting anomalous performances. Cascading failures visualization 400A can be used to illustrate to a network administrator causes of system failure, according to one implementation. In other implementations, cascading failures visualization 400A may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware.

In particular, FIG. 4A shows a time-lapsed view of cascading failure result links between anomalous performances of 'webapp' 412, 'AppService' 414, 'MongoSevice' 408, and 'MemCacheService' 428 occurring within a predetermined time period. The greyed resources instances 408A-B, 414A-B, and 412 represent resources impacted with correlated anomalous performances, which originate from MongoSevice 408 and progress over time to AppSevice 414 and then to webapp 412.

FIG. 4B illustrates one implementation of portal 400B that provides a drill-down access to anomalous performances illustrated in cascading failures visualization 400A. Portal 400B can be used to illustrate to a network administrator causes of system failure, according to one implementation. In other implementations, portal 400B may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware.

In particular, FIG. 4B provides drill-down access to anomalous performances occurring at resource instance 408A. As shown, portal window 432 identifies the type of the resource at which the anomalous performance was detected, along with the name of the resource and its Internet Protocol (IP) address. Also, portal window 442 identifies the type of the anomalous performances and corresponding anomaly time instance data. Further, portal window 438 identifies standard deviations of the anomalous performances from a mean value of corresponding baselines.

FIG. 5 is one implementation of a timeline portal 500 that shows how anomalous performance spread in time among the impacted resources. Timeline portal 500 also includes a slider zoom control 502 that can be manipulated to zoom in or zoom out into each individual anomalous performances depicted on the timeline portal 500.

Anomaly Correlation Algorithm

Correlating Anomalies

In one implementation, an anomaly is represented using the following notation:

Let A be the set of all anomalies in the network. An anomaly a \in A is identified by the following attributes:
Node n on which the anomaly occurred.
Event stream on which the anomaly was detected that is identified by an event stream ID.
Lifetime of the anomaly identified by start-time and end-time.
Given anomaly a, let a_start be the start-time of a, and a_end be the end-time of a.
Let A(t) be the set of all anomalies at time t. Then, A(t)={anomalies a \in A:a_start<=t<=a_end}.

In another implementation, an application topology is represented using the following notation:
Let N be the set of all nodes in the network.
Given node n \in N:
Let O(n) be the set of nodes connected to n via outgoing edges.
Let I(n) be the set of nodes connected to n via incoming edges.
Let A(n, t) be the set of all anomalies on node n at time t.

In another implementation, one instance of anomaly correlation is represented using the following notation:
If two anomalies are correlated, they are connected with an edge.
Let E be the set of all edges between anomalies.
An edge between two anomalies has the following attributes:
A source anomaly identified as "src."
A target anomaly identified as "tgt."
Lifetime of the edge identified by start-time (start) and end-time (end).
Let E(t) be the set of all edges between anomalies at time t.
Then, E(t)={edges e \in E:e_start<=t<=e_end}.
Let EO(a, t) be the set of all outgoing edges from anomaly a at time t.
Let EI(a, t) be the set of all incoming edges to anomaly a at time t.

In some implementations, anomaly correlation algorithm includes the actions of adding an anomaly, removing an anomaly, and periodically processing edges between a set of anomalies. In one example, if a new anomaly a is detected at time t1 and disappears at time t2, then anomaly correlation includes the following actions:
addAnomaly(a, n, t1), which adds anomaly a on node n of the network at time t1.
removeAnomaly(a, n, t2), which removes anomaly a from the network at time t2.

The following code shows one implementation of adding an anomaly to an anomaly impact graph based on a time constant T(add), such that two anomalies on connected nodes are considered to be correlated if their starting times differ by less than T(add).

```
def addAnomaly(a, n, t) {
    for (node m in I(n)) {
        for (anomaly b in A(m, t − T(add)) and b_end == null) {
            e = existing edge between b and a || new Edge
            e_src = a
            e_dst = b
            e_start = t
            e_end = null
            E(t) = E(t) U { e }
        }
    }
}
```

In one implementation, if anomaly a and anomaly b are connected node pairs linked by an edge and anomaly b disappears while anomaly a continues to exist, then anomaly a is determined to not give occurrence to anomaly b. As a result, the edge between anomaly a and anomaly b is removed. To the contrary, if anomaly a disappears while anomaly b continues to exist, then anomaly a is determined not to cause to anomaly b. Therefore, the edge between anomaly a and anomaly b is removed. In another implementation, if anomalies a and b disappear around the same window of time, then the edge between anomaly a and anomaly b is maintained.

The following code shows one implementation of removing an anomaly from an anomaly impact graph based on one or more constants such that if anomaly a and anomaly b are connected by an edge e=(a, b), then

```
T(remove_bkwd): If a_end − b_end > T(remove_bkwd), then a and b
are not considered connected.
T(remove_fwd): If b_end − a_end > T(remove_fwd), then a and b are
not considered connected.
    def removeAnomaly(a, t) {
        for (e in EI(a, t)) {
            e.mark_src_delete = t + T(remove_bkwd)
        }
        for (e in EO(a, t)) {
            t + T(remove_fwd)
            e.mark_tgt_delete = t + T(remove_fwd)
        }
        a.end = t
    }
```

The following code shows one implementation of periodically processing edges between connected node pairs an anomaly impact graph at regular intervals.

```
def processEdges(t) {
    for (e \in E(t)) {
        a = e.src
        b = e.tgt
        if (e.mark_src_delete != null &&
        a.end > e.mark_src_delete) {
            delete e
        }
        else if (e.mark_tgt_delete != null && b.end >
        e.mark_tgt_delete) {
        }
        else {
            e.end = b.end
        }
    }
}
```

Correlating Anomaly Streams

Some other implementations include correlating time-series of anomalies referred to as anomaly clusters by using the following notion:

According to one implementation, an anomaly time-series can be defined by the following attributes:

Node on which an anomaly occurred, referred to as "host."

Event stream on which an anomaly was detected, identified using "esid."

Time intervals during which respective anomalies occurred, identified using lifetimes List([start, end]).

Number of times an anomaly occurred, identified using support.

According to another implementation, an edge between a set of anomaly time-series can be defined by using the following attributes:

Source anomaly stream, identified using "src."

Target anomaly stream, identified using "tgt."

Time intervals during which an edge was active, identified using lifetimes List([start, end]).

Number of times an anomaly occurred, identified using "support."

Historical co-occurrence of anomalies in the anomaly set, identified using "source_target_support."

According to yet another implementation, causality probability can be calculated for each edge e=(as, bs) by using the following attributes:

e.    source_causes_target_prob=e.source_target_support/as.support.

target_causes_source_prob=e.source_target_support/bs.support.

Some implementations include decaying the importance of previously calculated support over time to improve the accuracy of the causality probability determination.

In some implementations, high values of source_causes_target_prob for an edge mean higher confidence in that edge, which in turn indicates a strong causality relationship between the two anomaly time-series. In another implementation, if both source_causes_target_prob and target_causes_source_prob have high values and are approximately equal, then this indicates that the two anomaly time-series are correlated with no clear cause. In such an implementation, causality can be determined based on the application topology. If the application topology does identify the required causality relationship, then the two anomaly time-series are determined to be correlated with no clear cause.

In other implementations, target_causes_source_prob>>source_causes_target_prob indicates that the causality is in the reverse direction i.e. the target anomaly causes the source anomaly. Responsive to this indication, the direction of the edge can be reversed, according to one implementation.

The following code shows one implementation of adding an anomaly to an anomaly stream. In some implementations, adding an anomaly to an anomaly stream updates target_support for edges and also updates source_target_support if the source anomaly continues to be active.

```
def addAnomaly(astream, n, t) {
    astream.support += 1
    for (node m in I(n)) {
        for (anomaly stream bstream with anomaly in A(m, t − T(add))) {
            e = (bstream, astream)
                if (bstream.lifetimes.top.end == null) {
                    e.lifetimes.push([t, null])
                    e.source_target_support + 1
                }
                E(t) = E(t) U { e }
        }
    }
}
```

The following code shows one implementation of removing an anomaly from an anomaly stream.

```
def removeAnomaly(astream, t) {
    for (e in EI(astream, t)) {
        e.mark_src_delete = t + T(remove_bkwd)
    }
```

```
        for (e in EO(astream, t)) {
            e.mark_tgt_delete = t + T(remove_fwd)
        }
        astream.lifetimes.top.end = t
    }
```

The following code shows one implementation of periodically processing edges between anomaly streams at regular intervals.

```
def processEdges(t) {
    for (e \in E(t)) {
        astream = e.src
        bstream = e.tgt
        if (e.mark_src_delete != null &&
        astream.lifetimes.top.end >
        e.mark_src_delete) {
            delete e.lifetimes.top
            e. source_target_support--
        }
        else if (e.mark_tgt_delete != null &&
        bstream.lifetimes.top.end >
        e.mark_tgt_delete) {
            delete e.lifetimes.top
            e. source_target_support--
        }
        else {
            e.lifetimes.top.end = bstream.lifetimes.top.end
        }
    }
}
```

User Feedback

Some implementations include receiving user feedback on the results of anomaly correlation so as to improve the accuracy of anomaly correlation algorithm. One implementation includes receiving ratification or rejection from a user on whether an edge in the plot should actually exist. Some instances can include receiving a score, a range of values, stratifying labels like "strong," "weak, or "average," emoticons, likes, stars, thumbs up, bonuses, ratings, badges, one up, plus, share, or other rating metrics. In another example, for an edge between two anomalies, A1 and A2, a user may be presented with three options—"up vote" or "down vote" or "other." An up vote can be interpreted as positive feedback and appreciate the causality probability weight of the edge. In contrast, down vote can be interpreted as negative feedback and depreciate the causality probability weight of the edge.

In other implementations, an aggregated score or average can be calculated for an edge's causality probability based on the anomaly correlation algorithm and the user feedback on the results of the correlation. For instance, F can be a number between 0-1 that determines the relative weight assigned to the support part of the probability. Then 1−F is the weight assigned to the vote part. These values can then be used to modify the values of the factors used in the probability function.

The following code shows one implementation of calculating causality probability based on the anomaly correlation algorithm and user feedback on the results of the correlation.

```
def upvote(e) {
    a = e.src
    b = e.tgt
    e.upvotes += 1
    vote_prob = (2 * e.upvotes / (e.upvotes + e.downvotes)) − 1
    support_prob = e.source_target_support / a.support
    e.probability = F * support_prob + (1−F) * vote_probability
    probability
}
def downvote(e) {
    a = e.src
    b = e.tgt
    e.downvotes += 1
    vote_prob = (2 * e.upvotes / (e.upvotes + e.downvotes)) −
    1 support_prob
    = e.source_target_support / a.support
    e.probability = F * support_prob + (1−F) * vote_probability
    probability
}
```

In yet other implementations, the accuracy of the anomaly correlation algorithm can be improved by using crowedsourced feedback. In one implementation, user feedback collected for one customer account can be used across other customer accounts or other network communication paths with a same customer account to further improve the accuracy of anomaly correlation algorithm as a result of similar anomaly signatures being used across customer account. For example, two anomalies that occur on the reads/sec metric on two different My SQL server nodes on two different accounts can have a similar anomaly signature and can share information about failure root causes. Therefore, if a user says that an anomaly on a MySQL server is correlated with an anomaly on an app server, that information can be used to correlate similar anomalies at a different account.

In some implementations, anomalies are correlated based on implicit user feedback. Examples of implicit user feedback include how the users navigate network monitoring tools and/or how the users curated the presented anomaly results (investigation duration of a particular anomaly result, frequency of investigating a particular anomaly result).

Anomaly Ranking

FIG. 6 depicts a representative method 600 of ranking anomalies in a cluster. Flowchart 600 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

Action 610, performance data for a multiplicity of metrics across a multiplicity of resources on a network is assembled. Also, criteria are automatically set over time based on the performance data that qualifies a subset of the performance data as anomalous instance data. In one implementation, the anomalous instance data are grouped in a cluster of operation anomalies that are interrelated as cascading failures Action 620, a map of active network communication paths that carry communications among resources subject to anomalous performances is constructed. Also, the active network communication paths are represented as edges between nodes representing anomalous instance data for the resources.

Action 630, impact rankings are calculated for the nodes based at least on attributes of the resources exhibiting anomalous performances. In one implementation, resource attributes include predetermined importance values assigned to the resources exhibiting anomalous performances; for example by an expert network operator or a network administrator. In another implementation, resource attributes include visibility of the resources exhibiting anomalous performances such that if a resource is a consumer facing or front-end service, application, or system, then that resource can have a higher impact ranking than a back-end service, application, or system. In yet another implementation, resource attributes include redundant availabilities of the resources exhibiting anomalous performances such that if multiple instances or replicas of a resource are active at a same point in the network, then anomalies occurring at one of the many instances of the redundant resource can have a lower ranking than an exclusively available single resource.

Action 640, human feedback is received from one or more users on the calculated impact rankings for the nodes representing anomalous instance data for the resources. In some implementations, human feedback is assembled by displaying the results of anomaly ranking to the users and receiving user evaluation of the results through a keyboard and a pointing device (e.g., a mouse or a trackball). In other implementations, human evaluation is received through visual feedback, auditory feedback, gestural feedback, or tactile feedback. The received human feedback is maintained in user feedback data store 122 and automatically updated over time, according to one implementation. Further, new impact rankings are calculated for the nodes based on the received human feedback.

Action 650, impact rankings for the nodes are calculated based on human inspection and evaluation of the detected anomalies. In one implementation, this includes determining the amount of time a user spent inspecting a particular anomaly by tracking user behavior observations i.e. how the user navigates network monitoring tools.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as anomaly ranking environment, anomaly prioritizing algorithms, user feedback interface, or anomaly data structures.

In one implementation, the anomaly rankings are calculated based on an aggregated score or average of at least one of the resource attributes, anomalous performance attributes, human feedback, and human behavior observations.

Other implementations of the method can include a non-transitory computer readable storage medium storing instructions executable by a processor to perform any of the methods described above. Yet another implementation may include a system including memory and one or more processors operable to execute instructions, stored in the memory, to perform any of the methods described above.

FIG. 7 depicts a representative method 700 of ranking anomalies in a cluster.

Flowchart 700 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

Action 710, performance data for a multiplicity of metrics across a multiplicity of resources on a network is assembled. Also, criteria are automatically set based on the performance data over time that qualifies a subset of the performance data as anomalous instance data. In one implementation, the anomalous instance data are grouped in a cluster of operation anomalies that are interrelated as cascading failures Action 720, a map of active network communication paths that carry communications among resources subject to anomalous performances is constructed. Also, the active network communication paths are represented as edges between nodes representing anomalous instance data for the resources.

Action 730, impact rankings are calculated for the nodes based at least on attributes of the anomalous performances. In some implementations, anomaly performance attributes specify severities of the anomalous performances. In one implementation, the severities of the anomalous performances are calculated based on number of standard deviations from a mean value of corresponding performance metrics. In another implementation, the severities of the anomalous performances are calculated based on number of additional resources impacted or likely to be impacted by the anomalous performances of the resources. In yet another implementation, the severities of the anomalous performances are calculated based on number of previous anomalous performances that caused the anomalous performances exhibited by the resources. In some other implementation, the severities of the anomalous performances are calculated based on impact rankings of previous anomalous performances that caused the anomalous performances exhibited by the resources.

In other implementations, anomaly performance attributes include predetermined confidence values assigned to the anomalous performances; for example by an expert network operator or a network administrator. In one implementation, the confidence values specify a likelihood of the anomalous performances impacting the resources. In some implementations, anomaly performance attributes include duration of the anomalous performances. In some other implementations, anomaly performance attributes identify metrics for which the anomaly instance data is assembled.

Action 740, human feedback is received from one or more users on the calculated impact rankings for the nodes representing anomalous instance data for the resources. In some implementations, human feedback is assembled by displaying the results of anomaly ranking to the users and receiving user evaluation of the results through a keyboard and a pointing device (e.g., a mouse or a trackball). In other implementations, human evaluation is received through visual feedback, auditory feedback, gestural feedback, or tactile feedback. The received human feedback is maintained in user feedback data store 122 and automatically updated over time, according to one implementation. Further, new impact rankings are calculated for the nodes based on the received human feedback.

Action 750, impact rankings for the nodes are calculated based on human inspection and evaluation of the detected anomalies. In one implementation, this includes determining the amount of time a user spent inspecting a particular anomaly by tracking user behavior observations i.e. how the user navigates network monitoring tools.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as anomaly ranking environment, anomaly prioritizing algorithms, user feedback interface, or anomaly data structures.

In one implementation, the anomaly rankings are calculated based on an aggregated score or average of at least one of the resource attributes, anomalous performance attributes, human feedback, and human behavior observations.

Other implementations of the method can include a non-transitory computer readable storage medium storing instructions executable by a processor to perform any of the methods described above. Yet another implementation may include a system including memory and one or more processors operable to execute instructions, stored in the memory, to perform any of the methods described above.

Anomaly Ranking Algorithm

Static Importance

In one implementation, a static importance of anomalous performances is calculated using an anomaly ranking algorithm based on attributes of the resources exhibiting anomalous performances and/or attributes of the anomalous performances. This implementation is as follows:

Let $OI(m, s) = f(I_s, R_s, I_m, X \ldots)$ be the overall importance (OI) of metric m for service s, where $I_s$ refers to the importance of the underlying service, which can be a number between [0,1], according to one implementation.

$R_s$ refers to the redundancy of the service. For example, if S is a mongo service, where each shard is a 3-node replica set, then $R_s=3$. According to one implementation, higher redundancy can result in lower overall importance.

$I_m$ refers to the importance of the metric for which the anomalous performances are detected. This can be a number between [0,1], according to one implementation.

X refers to other environmental factors.

$f$ is a function that combines these importance values to derive the importance of the metric. There can be several different functions $f_n$ to derive OI depending of the nature of the system. One example of the function $f$ can be:

$f(Is, Rs, Im)=K1*Is*(1/Rs)*Im+K2$ (where K1, K2 may be arbitrary parameters whose values depend on the specific system).

Let $I(a)=g(Ca, Sa, Da, Y \ldots)$ be the importance (I) of the anomaly, where $C_a$ refers to the confidence in an anomaly a. This can be a number between [0,1], according to one implementation.

$S_a$ refers to the severity of the anomaly. It can be a number between [0, ∞] that can be based on the percentage difference between the baseline and the anomalous value, according to one implementation.

$D_a$ refers to the duration of the anomaly, for example in seconds, according to one implementation.

Y refers to other environmental factors.

g is a function that takes the above values and calculates an I score. There can be several different functions $g_n$ to derive I depending of the nature of the system. One example of the function g can be:

$g(Ca, Sa, Da)=K3*Ca*Sa*\log(Da)+K4$ (where K3, K4 can be any arbitrary parameters whose values depend on the specific system).

Let $sRank(a, m, s)=h(OI(m, s), I(a), Z \ldots)$ be the static importance of the anomaly a for a metric m on service s. Here, h is a function that combines the above two importance values and any additional factors indicated by Z, according to one implementation. There can be several different functions $h_n$ to derive sRank depending of the nature of the system. One example of the function h can be:

$h(a, b)=K5*a*b+K6$ (where K5, K6 can be arbitrary parameters whose values depend on the specific system).

In some implementations, the anomaly ranking is based on the number anomalies caused by a particular anomaly. For instance, if an anomaly cluster A includes the anomalies {a1, a2, a3, a4, a5} such that preceding anomalies cause all of the succeeding anomalies, then anomalies that cause more anomalies are ranked higher, in one implementation. Thus, in this example, in causation terms, a1→a2→a3→a4→a5, therefore, in ranking terms, a1>a2>a3>a4>a5.

Anomaly Ranking Interface

FIG. 8 illustrates one implementation of an interface 800 of ranked anomalies. Interface 800 can be used to illustrate to a network administrator causes of system failure, according to one implementation. In other implementations, interface 800 may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware. In particular, interface 800 identifies the type and name of the anomalies 802, percentage difference from the baseline 804, the calculated importance score 806, and the impacted resources 808.

FIG. 9A illustrates one implementation of a method of ranking anomaly clusters. Flowchart 900 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

At action 910, performance data is assembled for a multiplicity of metrics across a multiplicity of resources on a network. Also, criteria are automatically set over time based on the performance data that qualifies a subset of the performance data as anomalous instance data.

At action 920, the anomalous instance data are grouped into an anomaly cluster including anomaly nodes that represent detected anomalies that compromise respective resources and represent probability weighted directed edges connecting correlated anomaly nodes. In one implementation, the probability weighted directed edges express strength of a correlation between the correlated anomaly nodes that are connected by the edges.

At action 930, importance of the anomaly cluster is scored by calculating anomaly node importance of anomaly nodes in the cluster, propagating the anomaly node importance values to terminal nodes in the anomaly cluster, and aggregating the propagated anomaly values of the terminal nodes.

At action 940, the scoring is repeated for a plurality of anomaly clusters and at least relative scoring of the anomaly clusters is reported for further processing.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as cluster ranking environment, cluster prioritizing algorithms, user feedback interface, or anomaly data structures.

In some implementations, the reporting at least relative scoring of the anomaly clusters includes identifying a number of service level agreements violated by the anomalies. In one implementation, reporting at least relative scoring of the anomaly clusters further includes specifying a count of detected anomalies in an anomaly cluster that compromised the respective resources.

In other implementations, responsive to selection of an anomaly count in a cluster, the detected anomalies are identified along with the compromised respective resources. In one implementation, reporting at least relative scoring of the anomaly clusters further includes specifying a count of resources compromised by the anomalies.

In some other implementations, responsive to selection of a resource count in a cluster, resources compromised by the anomalies in the anomaly cluster are identified. In one implementation, reporting at least relative scoring of the anomaly clusters further includes calculating a rating of urgency of the anomaly clusters responsive to the calculated anomaly node importance of anomaly nodes in the cluster.

In yet other implementations, the anomaly clusters are visually coded, responsive to the calculated anomaly node importance of anomaly nodes in the cluster, to indicate severity of respective anomaly clusters.

Other implementations of the method can include a non-transitory computer readable storage medium storing instructions executable by a processor to perform any of the methods described above. Yet another implementation may include a system including memory and one or more processors operable to execute instructions, stored in the memory, to perform any of the methods described above.

Cluster Ranking Algorithm

Importance Propagation

FIGS. 9B-9C illustrate one implementation of impact propagation mechanism for ranking anomaly clusters. In some implementations, graph transformation 900B-C is performed by reversing the edges of impact propagation graph 900B to generate inverse impact propagation graph 900C. In FIGS. 9B-9C, static importance (AR) refers to aRank importance of the node. At the beginning of graph transformation 900B-C, each node is initialized with an AR of 1, according to one implementation.

One implementation includes exploring impact propagation graph 900C using a breadth-first-search (BFS) technique. This implementation includes transforming the queue of nodes Q by:

Action 1: Identifying the nodes in the graph 900C that do not have any incoming edges, which are nodes A5 and A6.

Adding these nodes to queue Q i.e. Q={A5, A6}.

Action 2: Picking the first node from the queue Q. This is A5.

Processing A5 as follows:
Add these nodes to the queue Q. Now, Q={A6, A4, A1}.
Propagate the aRank of A5 across all its outgoing edges in proportion to the edge weights.
Total edge weight of all outgoing edges=0.8+0.6=1.4.
Propagate aRank of K*11.42 (=K*20*0.8/1.4) to node A1, and K*8.57 (=K*20*0.6/1.4) to node A4, where K is a parameter depending on the system.
New aRank at A1=10+11.42 (from A5)=21.42.
New aRank at A4=15+8.57 (from A5)=23.57.
Performing Action 2 and continuing the BFS exploration of graph 900C. When the terminal nodes arrive, all nodes can have a steady-state value of aRank, which determines the rank for the anomaly cluster.

Cluster Ranking Portal

FIGS. 10A-10C illustrate one implementation of depicting importance of anomaly clusters. In particular, FIGS. 10A-10C show a portal 1000 with a dashboard that reports a plurality of clusters of operation anomalies called fires 1014 with rating of urgency of a cluster. Portal 1000 can be used to illustrate to a network administrator causes of system failure, according to one implementation. In other implementations, portal 1000 may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware.

In one implementation, the rating of urgency is graphically depicted using filled and open bars that correspond to a percentage of criticality. In another implementation, portal 1000 provides an indication of at least the number of service level agreements (SLAs) violated, a magnitude of anomaly count for anomalies in the cluster, number of resources impacted, and corresponding anomaly time instance data. Yet other implementations include portal 1000 depicting a notification summary 1004 of the detected anomaly clusters and an overall status of the system or the network 1002.

In some implementations, portal 1000 includes a slider control that provides a drill-down access to anomalies in the cluster. In one implementation, portal 1000 identifies the type of the anomalous performances 1054 and corresponding anomaly time instance data. Also, portal 1000 identifies the type of the resource at which the anomalous performance was detected 1064, along with the name of the resource and its Internet Protocol (IP) address. Further, portal 1000 identifies standard deviations of the anomalous performances from a mean value of corresponding baselines, in some other implementation.

In the example shown in FIGS. 10A-10C, three fires named SANDY 1024, IKE 1034, and CARLOS 1044 are detected. For each of the fires, a level of criticality is identified along with anomaly metadata described above.

User Feedback

Some implementations include receiving user feedback on the results of anomaly ranking so as to improve the accuracy of anomaly ranking algorithm. For instance, user feedback can be received for a ranked list of anomalies using "Move Up" and "Move Down" buttons next to each anomaly, as illustrated in the following example:

When the user clicks on the "Move Up" button next to A2, it moves the anomaly to A1's position, and A1 moves down to A2's position.

Following this, the user can be asked one or more questions based on the factors used in the static importance function, such as:

Q1 Is service for A1 more important than service for A2?
Answers: YES or NO or Not Applicable.
Q2 Is metric for A1 more important than metric for A2?
Answers: YES or NO or Not Applicable.
Q3 Should the severity of the anomaly A2 be increased?
Answers: YES or NO or Not Applicable.

Further, when the user clicks on the "Move Down" button next to anomaly A2, it moves A2 down to A3's position, and A3 up to A2's position. This indicates that the user ranks this anomaly lower than the anomaly that it displaced.

Following this, the user can be asked one or more questions based on the factors used in the static importance function, such as:

Q4 Is service for A2 less important than service for A3?
Answers: YES or NO or Not Applicable.
Q5 Is metric for A2 less important than metric for A3?
Answers: YES or NO or Not Applicable.
Q6 Should the severity of the anomaly A2 be decreased?
Answers: YES or NO or Not Applicable.

The following code shows one implementation of calculating impact rankings for anomalies and anomaly clusters based on the received user feedback on the results of the anomaly ranking:

```
def moveUp(a2, a1, ansQ1, ansQ2, ansQ3) {
        if (ansQ1 == YES) {
            s = a2.service
            Is *= 1.5
        }
        if (ansQ2 == YES) {
            m = a2.metric
            Im *= 1.5
        }
        if (ansQ3 == YES) {
            Sa2 *= 1.5
        }
}
def moveDown(a2, a3, ansQ4, ansQ5, ansQ6) {
        if (ansQ4 == YES) {
            s = a2.service
            Is /= 1.5
        }
        if (ansQ5 == YES) {
            m = a2.metric
            Im /= 1.5
        }
        if (ansQ6 == YES) {
            Sa2 /= 1.5
        }
}
```

In yet other implementations, the accuracy of the anomaly ranking algorithm can be improved by using crowedsourced feedback. In one implementation, user feedback collected for one customer account can be used across all customer accounts to further improve the accuracy of anomaly ranking algorithm as a result of similar anomaly signatures being used across customer accounts. For example, two anomalies that occur on the reads/sec metric on two different MySQL server nodes on two different accounts can have a similar anomaly signature and can share anomaly importance measures. Therefore, if a user says that an anomaly on a MySQL server is more important than an anomaly on system metrics of an app server, that information can be used to rank similar anomalies for a different customers system.

In some implementations, anomalies are ranked based on implicit user feedback. Examples of implicit user feedback include how the users navigate network monitoring tools and/or how the users curated the presented anomaly results (investigation duration of a particular anomaly result, frequency of investigating a particular anomaly result).

Time-Lapsed View

FIG. 11 is a flowchart 1100 showing a method of depicting evolution of resource failures across a network. Flowchart 1100 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

At action 1110, a resource connectivity graph is constructed with resource instances indicated grouped within resource blocks. In one implementation, the resource blocks are connected to represent an active communication network path among the resources.

At action 1120, record instances in resource blocks and resource blocks are visually coded to indicate impaired performance due to anomalies occurred at the resource instances.

At action 1130, the visual coding is adjusted over time and replayed over time to visualize propagation of anomalous performances among the resource blocks.

At action 1140, the method includes allowing pausing at a point in time to visualize anomalous performances at the paused point in time. In one implementation, the method also includes providing a drill-down access to anomalous performances at the paused point in time that identifies at least a timeline of anomalous performances showing how anomalous performances spread in time among the impaired resources.

At action 1150, the method includes allowing forward playing to a point in time in future to visualize potential anomalous performances at the forwarded point in time.

At action 1160, the method includes allowing reverse playing to a point in time in past to visualize anomalous performances at the reversed point in time.

This method and other implementations of the technology disclosed can include one or more of the following features and/or features described in connection with additional methods disclosed. Other implementations of the method can include a non-transitory computer readable storage medium storing instructions executable by a processor to perform any of the methods described above. Yet another implementation may include a system including memory and one or more processors operable to execute instructions, stored in the memory, to perform any of the methods described above.

FIGS. 12A-12E illustrate a time-lapsed view 1200A-E of the cascading failure result links that visualize anomalous performances across resources in a network. Time-lapsed view 1200A-E can be used to illustrate to a network administrator causes of system failure, according to one implementation. In other implementations, time-lapsed view 1200A-E may not have the same tabs, widgets, windows, screen objects, elements, or components as those listed above and/or may have other/different tabs, widgets, windows, screen objects, elements, or components instead of, or in addition to, those listed above, such as network topology graph, inter-anomaly time spacing, slider zoom control, or resource redundancy graph. The different tabs, widgets, windows, screen objects, elements, or components can be combined into single software modules and multiple software modules can run on the same hardware.

In particular, FIGS. 12A-12E show a representation of IT infrastructure resources as networked topology 1202, with one or more network entities color coded or represented according to their current state, such as health, utilization, etc. Record instances 1206 in resource blocks 1204 are visually coded to indicate impaired performance due to anomalies occurred at the resource instances 1206. Also, FIGS. 12A-12E identify the list of events 1224 that have occurred in the network up to the current point in time.

Further, time-lapsed view 1200A-E includes a playback feature that allows users to reverse playback from point in time $T_1$ to a previous point in time $T_0$ in order to see another view of how network state evolved. It also provides users the ability: to "pause" the playback of the network state at any point in time and view the network state at the paused point in time; to "step forward" or "step back," frame by frame and view network state at each point in time; to zoom in and out of a view of the overall IT network changing the level of detail visible to the user; or aggregate information or exposing details for any of the many network metrics or anomaly instance data, according to some implementations. In other implementations, it predicts impacts on additional resources not yet impacted and allows users to play forward from point in time $T_0$ to a upcoming point in time $T_1$ in order to see another view of how network will evolve in future, as shown in FIG. 12E.

Anomaly Objects

FIG. 13 shows one implementation of a plurality of objects 1300 representing anomalous instance data. As described above, this and other data structure descriptions that are expressed in terms of objects can also be implemented as tables that store multiple records or object types. Reference to objects is for convenience of explanation and not as a limitation on the data structure implementation. FIG. 13 shows metric objects 1310, resource objects 1315, anomaly objects 1320, anomaly lifetime objects 1325, failure objects 1330, and correlation objects 1335. In other implementations, objects 13300 may not have the same objects, tables, entries or fields as those listed above and/or may have other/different objects, tables, entries or fields instead of, or in addition to, those listed above, such as topology objects, detection objects, visibility objects, or redundancy objects.

Metric objects 1310 uniquely identify performance metrics of a network using "MetricID" field such as network traffic, bandwidth, packets per second, connections per second, maximum concurrent connections, bits per second, errors, dropped packets, flows per second, round trip time (RTT), web requests, jitter, or transactions per second. Resource objects 1315 identify the different resources in the network such as servers, applications, or databases using "ResourceID" field. Anomaly lifetime objects 1325 represent the anomaly time instance data, specifying start times and end times of the anomalous performances using "AnomalyID" field.

Failure objects 1330 specify the anomalous performances, such as unresponsive caches, occurring in the network using "FailureID" field. Correlation objects 1345 identify a chain of cascading failure links that specify a source anomaly, target anomaly, source resource, and target resource.

In other implementations, objects 1300 can have one or more of the following variables with certain attributes: SYSTEM_ID being CHAR (15 BYTE), ELEMENT_ID being CHAR (15 BYTE), ANOMALY_ID being CHAR (15 BYTE), SEVERITY_ID being CHAR (15 BYTE), VISIBILITY_D being CHAR (15 BYTE), REDUNDANCY_ID being CHAR (15 BYTE), CLUSTER_ID being CHAR (15 BYTE), CREATED_BY being CHAR (15 BYTE), CREATED_DATE being DATE, and DELETED being CHAR (1 BYTE).

Computer System

FIG. 14 is a block diagram of an example computer system 1400 for opportunistically identifying networking prospects. Computer system 1410 typically includes at least one processor 1414 that communicates with a number of peripheral devices via bus subsystem 1412. These peripheral devices can include a storage subsystem 1424 including, for example, memory devices and a file storage subsystem, user interface input devices 1422, user interface output devices 1420, and a network interface subsystem 1416. The input and output devices allow user interaction with computer system 1410. Network interface subsystem 1416 provides an interface to outside networks, including an interface to corresponding interface devices in other computer systems.

User interface input devices 1422 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1410.

User interface output devices 1420 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1410 to the user or to another machine or computer system.

Storage subsystem 1424 stores programming and data constructs that provide the functionality of some or all of the modules and methods described herein. These software modules are generally executed by processor 1414 alone or in combination with other processors.

Memory 1426 used in the storage subsystem can include a number of memories including a main random access memory (RAM) 1430 for storage of instructions and data during program execution and a read only memory (ROM) 1432 in which fixed instructions are stored. A file storage subsystem 1428 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1428 in the storage subsystem 1424, or in other machines accessible by the processor.

Bus subsystem 1412 provides a mechanism for letting the various components and subsystems of computer system 1410 communicate with each other as intended. Although bus subsystem 1412 is shown schematically as a single bus, alternative implementations of the bus subsystem can use multiple busses.

Computer system 1410 can be of varying types including a workstation, server, computing cluster, blade server, server farm, or any other data processing system or computing device. Due to the ever-changing nature of computers and networks, the description of computer system 1410 depicted in FIG. 14 is intended only as one example. Many other configurations of computer system 1410 are possible having more or fewer components than the computer system depicted in FIG. 14.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system including one or more processors coupled to memory, the memory loaded with computer instructions to rank anomalies in an anomaly cluster, the instructions, when executed on the processors, implement actions comprising:
   accessing performance data for a multiplicity of metrics across a multiplicity of resources on a network and automatically setting criteria based on the performance data over time that qualifies a subset of the performance data as anomalous instance data, wherein the anomalous instance data are grouped in a cluster of operation anomalies that are interrelated as cascading failures traced over active network communication paths among resources, wherein the communication paths propagate anomalous performances;
   constructing a map that graphically depicts propagation of the anomalous performances along the active network communication paths as edges between nodes representing the resources; and
   calculating impact rankings for the nodes, based at least on attributes of the resources exhibiting anomalous performances.

2. The system of claim 1, wherein resource attributes include predetermined importance values assigned to the resources exhibiting anomalous performances.

3. The system of claim 1, wherein resource attributes include visibility of the resources exhibiting anomalous performances.

4. The system of claim 1, wherein resource attributes include conditions of service level agreements violated by anomalous performances of the resources.

5. The system of claim 1, further implementing actions comprising ranking anomaly clusters by:
   accessing performance data for a multiplicity of metrics across a multiplicity of resources on a network and automatically setting criteria based on the performance data over time that qualifies a subset of the performance data as anomalous instance data;
   grouping the anomalous instance data into an anomaly cluster including anomaly nodes that represent detected anomalies that compromise respective resources and probability weighted directed edges connecting correlated anomaly nodes, wherein the probability weighted directed edges express strength of a correlation between the correlated anomaly nodes that are connected by the edges;
   scoring importance of the anomaly cluster by calculating anomaly node importance values for anomaly nodes in the cluster, propagating the anomaly node importance values to terminal nodes in the anomaly cluster and aggregating the propagated anomaly values of the terminal nodes; and
   repeating the scoring for a plurality of anomaly clusters and reporting at least relative scoring of the anomaly clusters for further processing.

6. A system including one or more processors coupled to memory, the memory loaded with computer instructions to depict evolution of resource failures across a network, the instructions, when executed on the processors, implement actions comprising:
   constructing a resource connectivity graph with services indicated grouped within resource blocks, wherein the resource blocks are connected to represent an active communication network path among the resources;
   visually coding record instances in resource blocks and resource blocks to indicate impaired performance due to anomalies occurred at the services; and
   adjusting the visual coding over time and allowing replay over time to visualize propagation of anomalous performances among the resource blocks.

7. A system including one or more processors coupled to memory, the memory loaded with computer instructions to organize network performance metrics into historical anomaly dependency data, the instructions, when executed on the processors, implement actions comprising:
   accessing performance data for a multiplicity of metrics across a multiplicity of resources on a network and automatically setting criteria based on the performance data over time that qualifies a subset of the performance data as anomalous instance data;
   constructing a map of active network communication paths that carry communications among first and second resources subject to anomalous performance and representing the active network communication paths as edges between nodes representing first and second resources, thereby forming connected node pairs;
   calculating cascading failure relationships from time-stamped anomalous instance data for the connected node pairs, wherein the cascading failure relationships are based at least in part on whether conditional probabilities of anomalous performance of the second resources given prior anomalous performance of the first resources exceed a predetermined threshold;
   wherein calculating the conditional probabilities makes use of a statistical measure of likelihood:
   conditional probability=p(anomalous second service-|anomalous first service); and
   automatically representing the anomalous performance of the second resource as a cascading failure resulting from the anomalous performance of the first resource based on the calculated cascading failure relationships.

8. The system of claim 7, wherein the time-stamped anomalous instance data identify at least start times of anomalous performances of the first and second resources that are within a predetermined time period, further including automatically representing anomalous performance of the second resource as a cascading failure resulting from the anomalous performance of the first resource.

9. The system of claim 7, wherein the time-stamped anomalous instance data identify at least end times of anomalous performances of the first and second resources that are within a predetermined time period, further including automatically representing anomalous performance of the second resource as a cascading failure resulting from the anomalous performance of the first resource.

10. The system of claim 7, further including calculating cascading failure relationships based at least in part on historical frequency of anomalous performance of the second resources given prior anomalous performance of the first resources.

11. The system of claim 7, further implementing actions comprising illustrating to a network administrator causes of system failure by:
   generating for display a cluster of operation anomalies that are interrelated as cascading failures in an anomaly impact graph, including:
   depicting anomalous instance data in the cluster as nodes in a plot;
   representing active network communication paths that carry communications among first and second resources subject to anomalous performances as edges between the nodes, thereby forming connected node pairs; and
   depicting at least part of the plot to show a progression over time of the cascading failures for the connected node pairs and to identify one or more root causes of the cascading failures.

12. The system of claim 7, further implementing actions comprising illustrating to a network administrator causes of system failure by:
   generating for display an anomaly impact graph interface that depicts a cluster of operation anomalies that are interrelated as cascading failures, including:
   nodes in a diagram that represent anomalous instance data for different resources in the cluster;
   edges between the nodes that represent active network communication path data for communications among first and second resources, wherein the edges and nodes form connected node pairs; and
   arrangement of the diagram that shows progression over time of cascading failure result links between anomalous performances of the first and second resources occurring within a predetermined time period.

13. A computer implemented method to rank anomalies in an anomaly cluster, including:
   accessing performance data for a multiplicity of metrics across a multiplicity of resources on a network and automatically setting criteria based on the performance data over time that qualifies a subset of the performance data as anomalous instance data, wherein the anomalous instance data are grouped in a cluster of operation anomalies that are interrelated as cascading failures traced over active network communication paths among resources, wherein the communication paths propagate anomalous performances;
   constructing a map that graphically depicts propagation of the anomalous performances along the active network communication paths as edges between nodes representing the resources; and
   calculating impact rankings for the nodes, based at least on attributes of the resources exhibiting anomalous performances.

14. The computer implemented method of claim 13, further including ranking anomaly clusters by:
   accessing performance data for a multiplicity of metrics across a multiplicity of resources on a network and automatically setting criteria based on the performance data over time that qualifies a subset of the performance data as anomalous instance data;
   grouping the anomalous instance data into an anomaly cluster including anomaly nodes that represent detected anomalies that compromise respective resources and probability weighted directed edges connecting correlated anomaly nodes, wherein the probability weighted directed edges express strength of a correlation between the correlated anomaly nodes that are connected by the edges;
   scoring importance of the anomaly cluster by calculating anomaly node importance values for anomaly nodes in the cluster, propagating the anomaly node importance values to terminal nodes in the anomaly cluster and aggregating the propagated anomaly values of the terminal nodes; and
   repeating the scoring for a plurality of anomaly clusters and reporting at least relative scoring of the anomaly clusters for further processing.

15. A computer implemented method to rank anomalies in an anomaly cluster, including:
   accessing performance data for a multiplicity of metrics across a multiplicity of resources on a network and automatically setting criteria based on the performance data over time that qualifies a subset of the performance data as anomalous instance data, wherein the anomalous instance data are grouped in a cluster of operation anomalies that are interrelated as cascading failures traced over active network communication paths among resources, wherein the communication paths propagate anomalous performances;
   constructing a map that graphically depicts propagation of the anomalous performances along the active network communication paths as edges between nodes representing the resources; and
   calculating impact rankings for the nodes, based at least on attributes of the anomalous performances.

16. A computer implemented method to depict evolution of resource failures across a network, the method including:
   constructing a resource connectivity graph with services indicated grouped within resource blocks, wherein the resource blocks are connected to represent an active communication network path among the resources;
   visually coding record instances in resource blocks and resource blocks to indicate impaired performance due to anomalies occurred at the services; and
   adjusting the visual coding over time and allowing replay over time to visualize propagation of anomalous performances among the resource blocks.

17. A computer implemented method to organize network performance metrics into historical anomaly dependency data, the method including:
   accessing performance data for a multiplicity of metrics across a multiplicity of resources on a network and automatically setting criteria based on the performance data over time that qualifies a subset of the performance data as anomalous instance data;
   constructing a map of active network communication paths that carry communications among first and second resources subject to anomalous performance and representing the active network communication paths as edges between nodes representing first and second resources, thereby forming connected node pairs;

calculating cascading failure relationships from time-stamped anomalous instance data for the connected node pairs, wherein the cascading failure relationships are based at least in part on whether conditional probabilities of anomalous performance of the second resources given prior anomalous performance of the first resources exceed a predetermined threshold;

wherein calculating the conditional probabilities makes use of a statistical measure of likelihood:

conditional probability=p(anomalous second service-|anomalous first service); and automatically representing the anomalous performance of the second resource as a cascading failure resulting from the anomalous performance of the first resource based on the calculated cascading failure relationships.

18. The computer implemented method of claim 17, further including illustrating to a network administrator causes of system failure by:

generating for display a cluster of operation anomalies that are interrelated as cascading failures in an anomaly impact graph, including:

depicting anomalous instance data in the cluster as nodes in a plot;

representing active network communication paths that carry communications among first and second resources subject to anomalous performances as edges between the nodes, thereby forming connected node pairs; and depicting at least part of the plot to show a progression over time of the cascading failures for the connected node pairs and to identify one or more root causes of the cascading failures.

19. The computer implemented method of claim 17, further including illustrating to a network administrator causes of system failure by:

generating for display an anomaly impact graph interface that depicts a cluster of operation anomalies that are interrelated as cascading failures, including:

nodes in a diagram that represent anomalous instance data for different resources in the cluster;

edges between the nodes that represent active network communication path data for communications among first and second resources, wherein the edges and nodes form connected node pairs; and arrangement of the diagram that shows progression over time of cascading failure result links between anomalous performances of the first and second resources occurring within a predetermined time period.

* * * * *